(12) United States Patent
Black et al.

(10) Patent No.: US 8,458,290 B2
(45) Date of Patent: Jun. 4, 2013

(54) MULTICAST MAPPED LOOK-UP ON CONTENT DELIVERY NETWORKS

(75) Inventors: Bryan Black, Tempe, AZ (US); Jacob S. Roersma, Grand Rapids, MI (US); Jared Boelens, Tempe, AZ (US); Neil Dunbar, Bristol (GB); Sig Lange, Tempe, AZ (US); Wylie Swanson, Tempe, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/341,724

(22) Filed: Dec. 30, 2011

(65) Prior Publication Data

US 2012/0198022 A1 Aug. 2, 2012

Related U.S. Application Data

(63) Continuation of application No. PCT/US2011/023410, filed on Feb. 1, 2011.

(30) Foreign Application Priority Data

Jul. 4, 2011 (AU) ................................ 2011203266

(51) Int. Cl.
*G06F 15/16* (2006.01)
(52) U.S. Cl.
USPC ........................................................ 709/217
(58) Field of Classification Search
USPC .... 709/217–219, 201–203, 223–226; 725/86, 725/92–93
See application file for complete search history.

(56) References Cited

U.S. PATENT DOCUMENTS

| | | | |
|---|---|---|---|
| 6,064,968 A | 5/2000 | Schanz | |
| 6,757,740 B1 | 6/2004 | Parekh et al. | |
| 6,918,120 B2* | 7/2005 | Riedel | 719/313 |
| 6,952,737 B1* | 10/2005 | Coates et al. | 709/229 |
| 7,136,922 B2 | 11/2006 | Sundaram et al. | |
| 7,266,556 B1 | 9/2007 | Coates | |
| 7,272,654 B1* | 9/2007 | Brendel | 709/229 |
| 7,376,727 B2 | 5/2008 | Weller et al. | |
| 7,376,736 B2 | 5/2008 | Sundaram et al. | |
| 7,627,391 B2 | 12/2009 | Key | |
| 7,664,839 B1 | 2/2010 | Karr et al. | |

(Continued)

FOREIGN PATENT DOCUMENTS

| KR | 10-2002-0076028 A | 10/2002 |
|---|---|---|
| WO | WO 2009/061829 A1 | 5/2009 |

OTHER PUBLICATIONS

U.S. Appl. No. 13/336,743, Office Action mailed Oct. 15, 2012, 15 pages.

(Continued)

*Primary Examiner* — Chirag R Patel
(74) *Attorney, Agent, or Firm* — Kilpatrick Townsend & Stockton, LLP

(57) ABSTRACT

A method and system for flexibly processing content objects is disclosed. A content object is stored on one of a plurality of storage devices. A request is received for the content object. Information corresponding to the requested object (e.g., a unique identifier) is transmitted to one or more content directories. A response is received from a first content directory indicating a location of the content object. The content object is requested from the first location, and at least part of the content object is received.

24 Claims, 19 Drawing Sheets

U.S. PATENT DOCUMENTS

| | | |
|---|---|---|
| 7,840,667 B2 | 11/2010 | Weller et al. |
| 7,860,964 B2 | 12/2010 | Brady et al. |
| 7,904,541 B2 * | 3/2011 | Swildens et al. ............... 709/223 |
| 8,023,429 B2 | 9/2011 | Briscoe et al. |
| 8,041,809 B2 | 10/2011 | Sundaram et al. |
| 8,108,507 B2 | 1/2012 | Weller et al. |
| 8,151,317 B2 | 4/2012 | Hinton et al. |
| 8,156,243 B2 * | 4/2012 | Richardson et al. .......... 709/238 |
| 8,165,122 B2 * | 4/2012 | Kotalwar et al. ............... 370/390 |
| 8,255,557 B2 | 8/2012 | Raciborski et al. |
| 8,291,083 B2 | 10/2012 | Black et al. |
| 2001/0034795 A1 | 10/2001 | Moulton et al. |
| 2002/0091801 A1 * | 7/2002 | Lewin et al. ................... 709/219 |
| 2002/0133491 A1 | 9/2002 | Sim et al. |
| 2002/0138652 A1 | 9/2002 | Taylor |
| 2002/0147774 A1 * | 10/2002 | Lisiecki et al. ................ 709/203 |
| 2003/0079027 A1 | 4/2003 | Slocombe et al. |
| 2003/0149581 A1 | 8/2003 | Chaudhri et al. |
| 2003/0217365 A1 | 11/2003 | Caputo |
| 2005/0005025 A1 | 1/2005 | Harville et al. |
| 2007/0156845 A1 | 7/2007 | Devanneaux et al. |
| 2008/0065724 A1 | 3/2008 | Seed et al. |
| 2008/0072264 A1 | 3/2008 | Crayford |
| 2008/0077682 A1 | 3/2008 | Nair et al. |
| 2008/0195664 A1 | 8/2008 | Maharajh et al. |
| 2008/0222291 A1 | 9/2008 | Weller et al. |
| 2009/0150518 A1 | 6/2009 | Lewin et al. |
| 2010/0023693 A1 | 1/2010 | Dilley et al. |
| 2010/0250710 A1 | 9/2010 | Cadwell et al. |
| 2010/0293185 A1 | 11/2010 | Rosado et al. |
| 2010/0325264 A1 | 12/2010 | Crowder et al. |
| 2011/0138394 A1 | 6/2011 | Ravishankar et al. |
| 2011/0218946 A1 | 9/2011 | Stern et al. |
| 2011/0252082 A1 | 10/2011 | Cobb et al. |
| 2011/0283304 A1 | 11/2011 | Roberts et al. |
| 2011/0320715 A1 | 12/2011 | Ickman et al. |
| 2012/0030170 A1 * | 2/2012 | Bernbo et al. ................. 707/634 |
| 2012/0054303 A1 | 3/2012 | Priyadarshan et al. |
| 2012/0066352 A1 | 3/2012 | Cadwell et al. |
| 2012/0198070 A1 | 8/2012 | Black et al. |
| 2012/0246472 A1 | 9/2012 | Berengoltz et al. |
| 2012/0303735 A1 | 11/2012 | Raciborski et al. |

OTHER PUBLICATIONS

U.S. Appl. No. 13/336,831 Office Action mailed Aug. 14, 2012, 15 pages.

U.S. Appl. No. 13/336,893 Office Action mailed Aug. 13, 2012, 9 pages.

"Content delivery network", retrieved from the internet at web address: http://web.archive.org/web/20101229031436/http://en.wikipedia.org/wiki/Content_delivery_network, 6 pages, Dec. 21, 2010.

International Search Report dated Oct. 21, 2011 for International PCT Application No. PCT/US2011/023410, 11 pages.

U.S. Appl. No. 13/344,263, Office Action mailed Jan. 11, 2013, 8 pages.

U.S. Appl. No. 13/336,831, Final Office Action mailed Feb. 11, 2013, 12 pages.

* cited by examiner

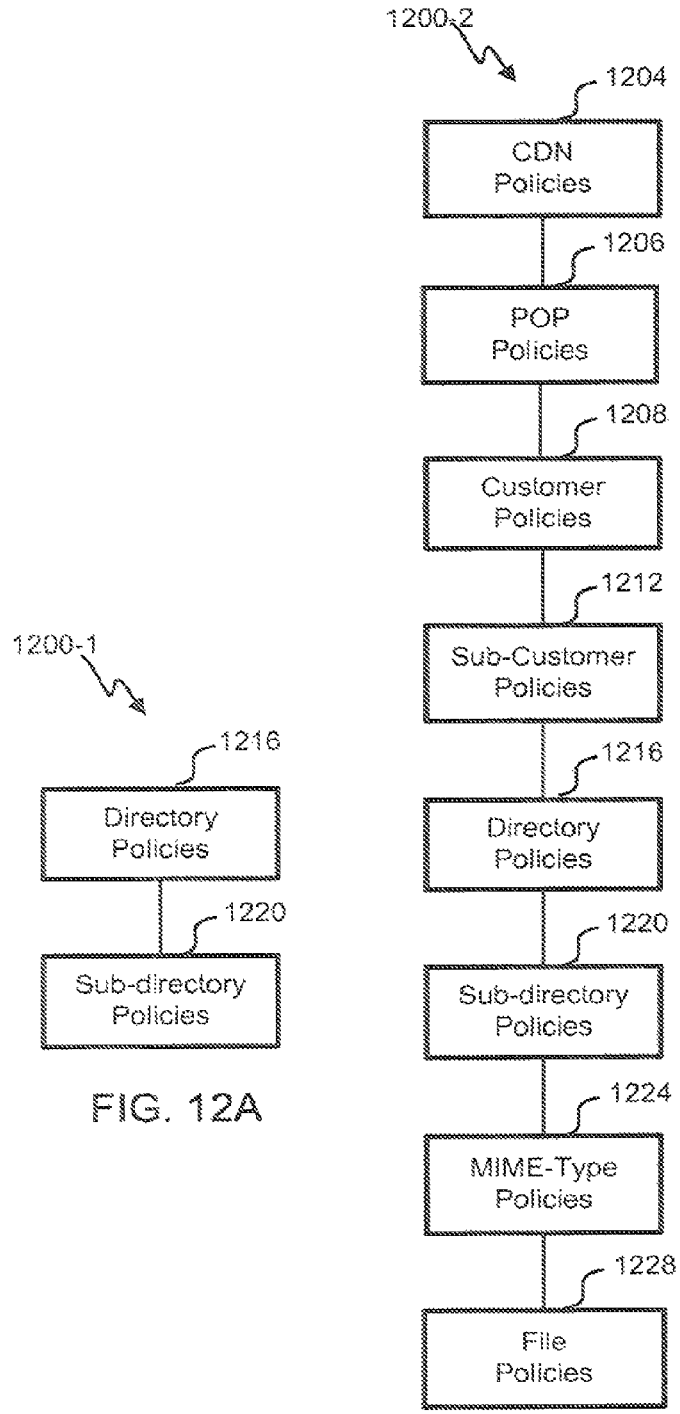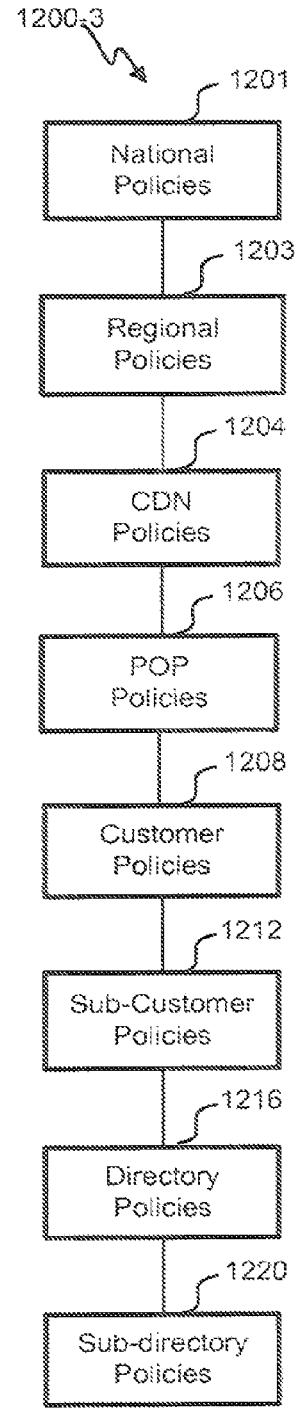
FIG. 12A  FIG. 12B  FIG. 12C

MULTICAST MAPPED LOOK-UP ON CONTENT DELIVERY NETWORKS

This application is related by priority to: PCT/US11/023410 filed Feb. 1, 2011, entitled "Asset Management Architecture for Content Delivery Networks," and Australian Patent Application No. 2011203266 filed Feb. 1, 2011, entitled "Multicast Mapped Look-Up On Content Delivery Networks;" both of which are hereby incorporated by reference in their entirety for all purposes.

BACKGROUND

This disclosure relates in general to content delivery networks (CDNs) and, but not by way of limitation, to managing assets associated with the CDN.

Content providers (i.e., customers) offload their content delivery to CDNs for any number of reasons. CDNs specialize in a range of content delivery and hosting options optimized for performance so that end users get a desired quality of service (QoS). Different CDNs have different topologies relying on more or less points of presence (POPs) distributed geographically across the Internet. CDNs with more POPs tend to have less resources in each POP, while those with less POPs tend to have more resources in each one. The topology and asset allocation in a particular CDN is inflexible.

Customers are using CDNs and cloud services in more creative ways. Applications, storage and other services are being provided remotely. CDNs have not provided the flexibility to adapt to all the needs of customers yet have an excellent topology of distributed POPs with fast interconnectivity between those POPs. Currently, limited interfaces to the CDN with little or no customization results in lost opportunity.

SUMMARY

In one embodiment, the present disclosure provides a method and system for flexibly processing content objects. The processing is performed with a content delivery network (CDN) having a number of geographically distributed points of presence (POPs). Content objects are ingested through landing pads and stored or otherwise processed in a flexible way where storage bricks and other resources are chosen flexibly by characterization tags. Policies are used to describe which content objects are processed by which categories of resources. A group of resources characterized by the tag are chosen when the processing is performed. When retrieving content, the content object can be stored on any storage brick found through the tag analysis process. A query is translated to addresses for the chosen storage brick(s).

In another embodiment, the present disclosure provides a method for sourcing a content object from a content delivery network (CDN) having a plurality of points of presence (POPs) distributed geographically. The content object is received for storage on the CDN. A unique identifier for the content object is identified to distinguish it from other content objects in the CDN. The content object is stored on a storage device chosen from a plurality of storage devices. A uniform resource locator (URL) is received for the content object indicating a file name and a path from an end user system at a POP of the plurality of POPs. Information corresponding to the file name and the path is multicast to a plurality of content directories distributed geographically within the CDN. Each content directory can provide location information for any of the plurality of storage devices that store at least some of the content object. A response is received from a content directory including a first location of the storage device and the unique identifier. The unique identifier is requested from the first location. At least some of the content object is passed from the first location to a second location within the CDN. At least some of the content object is returned to the end user system from the CDN.

In another embodiment, the present disclosure provides a content delivery network (CDN) for storing content objects and delivering content objects over a network to a user computer. The CDN includes a switching fabric to receive and route requests for content objects from user computers to a particular edge server, the requests including a filename. The CDN also includes a plurality of points of presence (POPs) distributed geographically. Each POP includes a metadata directory including a unique identifier assigner for assigning a unique identifier to a new content object; a content mapper coupled to a plurality of lookup listeners; and an edge server coupled to the switching fabric and to the content mapper. The edge server is configured to receive a request for a content object from the switching fabric, the request including a file name and/or a path of the requested content object. The content mapper is configured to receive the file name and/or the path from the edge server; translate the file name and/or the path into a corresponding unique identifier; transmit, at least partially simultaneously, the corresponding unique identifier to each of the lookup listeners; receive information identifying a location of a storage device storing the requested content object from one or more of the lookup listeners; and request the requested content object from the location.

In another embodiment, the present disclosure provides a method for sourcing a content object from a content delivery network (CDN) having a plurality of points of presence (POPs) distributed geographically. The content object for storage is received on the CDN. A unique identifier for the content object is determined to distinguish it from other content objects in the CDN. The content object is stored on a storage device chosen from a plurality of storage devices. A uniform resource locator (URL) is received for the content object indicating a file name and a path from an end user system at a POP of the plurality of POPs. Information corresponding to the file name and the path is multicast to a plurality of content directories distributed geographically within the CDN, wherein each content directory can provide location information for any of the plurality of storage devices that store at least some of the content object. A response is received from a content directory including a first location of the storage device and the unique identifier. The unique identifier is requested from the first location. At least some of the content object is returned from the first location to a second location within the CDN. At least some of the content object is returned to the end user system from the CDN.

In another embodiment, the present disclosure provides a content delivery network (CDN) having a plurality of points of presence (POPs) distributed geographically for sourcing a content object. The CDN includes two or more hardware servers programmed for: receiving the content object for storage on the CDN; determining a unique identifier for the content object to distinguish it from other content objects in the CDN; storing the content object on a storage device chosen from a plurality of storage devices; receiving a uniform resource locator (URL) for the content object indicating a file name and path from an end user system at a POP of the plurality of POPs; multicasting information corresponding to the file name and a path to a plurality of content directories distributed geographically within the CDN, wherein each content directory can provide location information for any of the plurality of storage devices that store at least some of the content object; receiving a response from a content directory including a first location of the storage device and the unique identifier; requesting the unique identifier from the first location; returning at least some of the content object from the first location to a second location within the CDN; and returning at least some of the content object to the end user system from the CDN.

In another embodiment, the present disclosure provides a method for sourcing a content object from a content delivery network (CDN) having a plurality of points of presence (POPs) distributed geographically. The content object is received for storage on the CDN. The content object is associated with an identifier to distinguish it from other content objects in the CDN. The content object is stored on a storage device chosen from a plurality of storage devices. A first request for the content object is received from an end user system at a POP of the plurality of POPs. Information about the requested content object is transmitted, at least partially simultaneously, to a plurality of content directories distributed geographically within the CDN. A response is received from a first content directory indicating that the content object is stored at a first location, the first location being a location of the storage device. A second request for the content object is transmitted to the first location. At least some of the content object is received at a second location within the CDN from the first location, the second location being different from the first location. At least some of the content object is returned to the end user system from the CDN.

In another embodiment, the present disclosure provides a content delivery network (CDN) having a plurality of points of presence (POPs) distributed geographically for sourcing a content object. The CDN includes a mapper transport for: receiving a request for a content file; and transmitting, at least partially simultaneously, multiple and identical requests for information about a location of the content file. The CDN also includes a first of a plurality of content directories programmed for: receiving one of the location requests; querying a mapper cabinet that associates content files with storage addresses; and transmitting information identifying a storage location of the content file to the mapper transport.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 12A, 12B and 12C depict block diagrams of embodiments of policy prioritization hierarchies;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
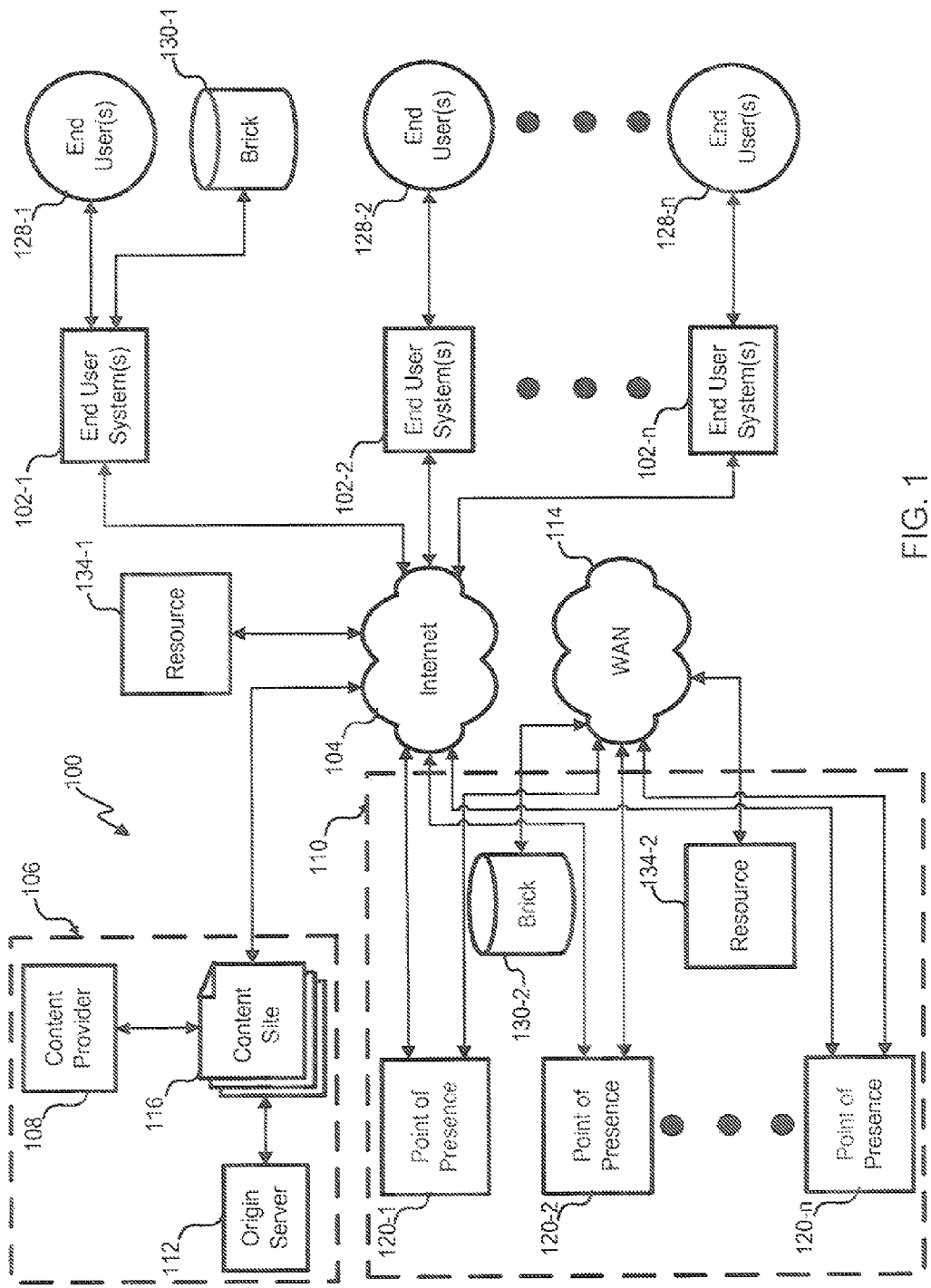
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can cache, redistribute and/or host content in various embodiments for third parties such as the content originator 106 to offload delivery and typically provide better quality of service (QoS).

In this embodiment, the content distribution system 100 locates the content objects (or portions thereof) and distributes the content objects to end user systems 102. A content object is any content file or content stream and could include, for example, video, pictures, data, audio, software, and/or text. The content object could be live, delayed or stored. Throughout the specification, references may be made to a content object, content, content stream and/or content file, but it is to be understood that those terms could be used interchangeably wherever they may appear.

Many content providers 108 use a CDN 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 to be proximate to end user systems 102. Multiple POPs 120 use the same IP address such that an Anycast routing scheme is used to find a POP 120 likely to be close, in network terms, to the end user for each request. In addition to the Internet 104, a wide area network (WAN) 114 or other backbone may couple the POPs 120 with each other and also couple the POPs 120 with other parts of the CDN 110.

When an end user 128 requests a web page through its respective end user system 102, the request for the web page is passed either directly or indirectly via the Internet 104 to the content originator 106. The content originator 106 is the source or re-distributor of content objects. The content site 116 is a web site accessible by the end user system 102. In one embodiment, the content site 116 could be a web site where the content is viewable with a web browser. In other embodiments, the content site 116 could be accessible with application software other than a web browser. In this embodiment, the content provider 108 directs content requests to a CDN 110 after they are made or formulates the delivery path to the CDN 110 by embedding the delivery path into the URLs for a web page. In any event, the request for content is handed over to the CDN 110 by using an Anycast IP address corresponding to one, two or more POPs 120.

Once the request for a content object is passed to the CDN 110, the request is associated with a particular POP 120 within the CDN 110 using the Anycast routing scheme. The particular POP 120 may retrieve content object from the content provider 108 if not already within the CDN 110. Alternatively, the content provider 108 may directly provide the content object to the CDN 110 and its associated POPs 120 through pre-population or hosting in advance of the first request. The CDN servers include edge servers that actually serve end user requests. The origin server 112 holds a copy of each content object for the content originator 106. Periodically, the content of the origin server 112 may be reconciled with the CDN 110 through a cache, hosting and/or pre-population algorithm. Some content providers 108 could use an origin server within the CDN 110 to host the content and avoid the need to maintain an accessible copy of the content object at the origin server 112 of the content originator 106.

Once the content object is retrieved from the origin server 112 by the CDN 110, the content object is stored in a manner accessible to the CDN to allow processing by that POP 120 to service the end user systems 102. For example, the content object could be stored on a brick 130. Streamed content objects can have real time or near real time information or can be previously stored. The end user system 102 receives the content object and processes it for use by the end user 128. The end user system 102 could be a personal computer, media player, handheld computer, Internet appliance, phone, IPTV set top, web server, processing system, streaming radio or any other device that receives and/or plays content objects. In some embodiments, a number of the end user systems 102 could be networked together. Although this embodiment only shows a single content originator 106 and a single CDN 110, it is to be understood that there could be many of each in various embodiments.

Storage accessible to the CDN 110 includes bricks 130 in this embodiment. A brick 130 is any storage medium inside or outside the CDN 110 that is part of a content management architecture (CMA). The storage medium includes a layer of software to accommodate commands for the brick. Any storage array, network attached storage, drive, flash media, or other non-volatile memory could act as a brick 130 with the proper layer of software. In this embodiment, one of the end user systems 102-1 has a brick 130-1 coupled to it. The CDN 110 could store content on any brick 130 to implement a policy, regardless of whether the brick is internal or external to the CDN 110.

Other resources 134 are available to the CDN 110 to process content. Resources 134 can be internal or external to the CDN 110. A brick 130 is just a resource, but it is broken out separately since the processing it performs is largely limited to storage. Generally, a resource 134 is any hardware or software function that can store or process a content object. Examples include, transcoders, cryptographic processors, compression engines, content processors (e.g., image processors, video processors or audio processors), thumbnail generators, media syndication services, video/audio ad insertion engines, video processing services, metadata insertion engines, or anything that can process content objects and can be interfaced with an API from the CDN 110. In this example, there is a first resource 134-1 available to the CDN 110 over the Internet 104 and a second resource 134-2 within the CDN 110, but it is to be understood there could be many more resources available to the CDN 110.

Figure 2A:
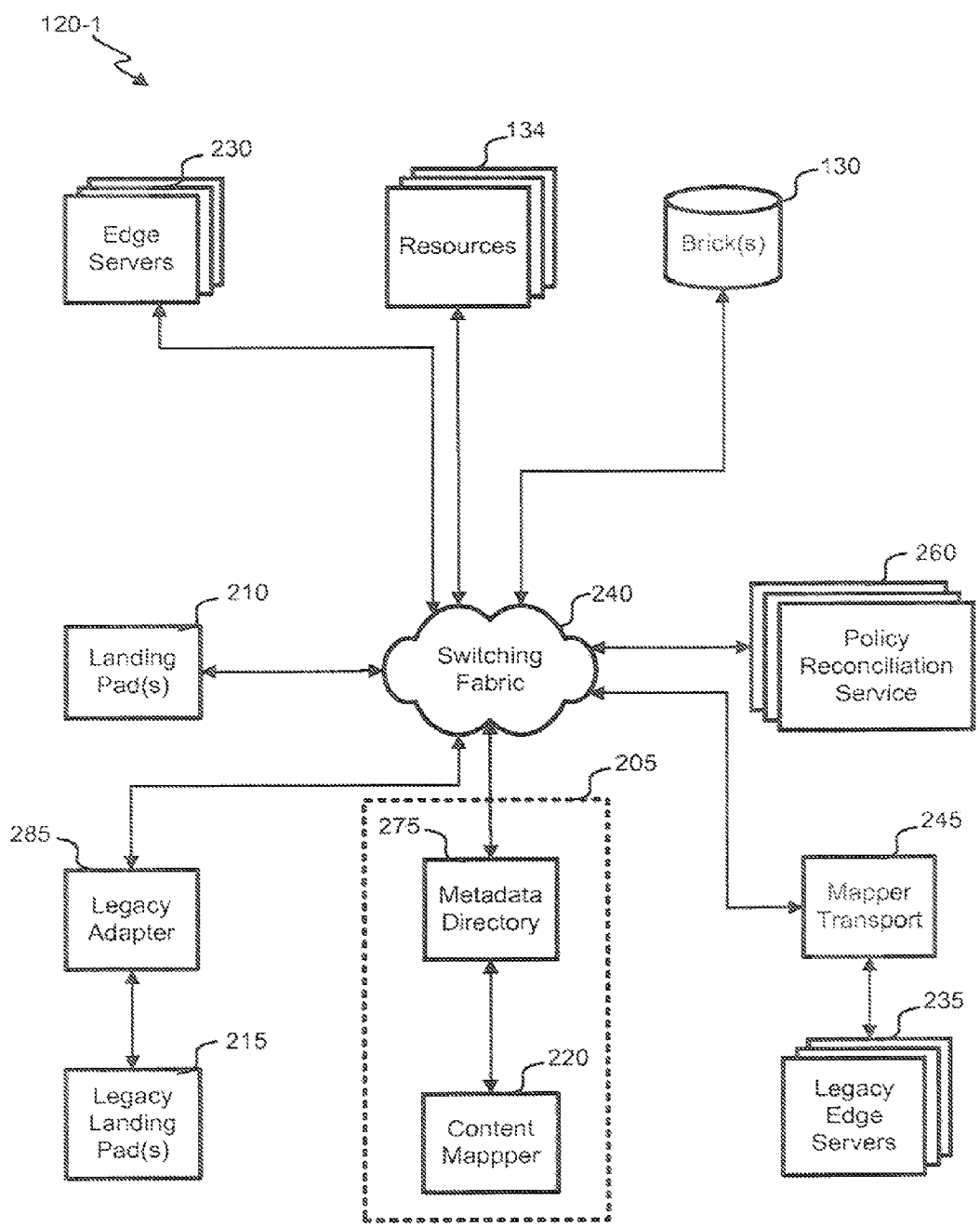
FIGS. 2A and 2B depict block diagrams of embodiments of a point of presence (POP)

With reference to FIG. 2A, a block diagram of an embodiment of a POP 120-1 is shown. There are both legacy edge servers 235 that don't natively support the CMA and edge servers 230 that do in this embodiment. Legacy edge servers 235 use a mapper transport 245 that supports the CMA to gather any content requested from CDN 110 and present the content like an origin server. The mapper transport 245 makes the calls necessary to locate the content and pass it to the legacy edge server 235. Requests are made to bricks 130 by the mapper transport 245 that acts as a reverse proxy to return the requested content. Typically, the software on the legacy edge server 235 does not require any rewriting to allow integration with the CMA because of the mapper transport 245.

The various edge servers 230, 235 are coupled to each other and the Internet 104 and WAN 114 using switching fabric 240. Edge servers 230, 235 number in the thousands in a given POP 120. The edge servers 230, 235 could be divided by function and/or customer. Loading algorithms can be used to divide load among the edge servers 230, 235 in any number of ways. The edge servers 230 perform caching, streaming, hosting, storage, and/or other functions within the POP 120. An edge server 230, 235 is typically a rack-mounted computer that could have varying levels of processing power, memory and storage. Software running on the edge server 230, 235 includes, for example, HTTP proxy caching, media servers, Flash™ servers, Java™ application servers, Silverlight™ servers, etc.

The switching fabric 240 is used for several functions. Incoming requests for content objects are routed to the edge servers 230, 235 using the switching fabric. This could be done using routing, redirection or domain name service (DNS). Load balancing, round-robin, and/or other techniques could be used by the switching fabric 240 to route requests to edge servers 230, 235. Communication within the POP 120 also uses the switching fabric 240. Edge servers 230, 235 could have multiple software applications running that communicate with other edge servers 230, 235.

There are legacy landing pads 215 and landing pads 210 supporting CMA. The legacy landing pads 215 use a legacy adapter 285 to integrate with the CMA. The legacy adapter 285 includes a portable operating system interface for Unix ("POSIX") adapter to allow backward compatibility to legacy landing pads 215. Many applications are designed to directly interface with the AMA without requiring the POSIX functionality of the legacy adapter 285. A universal namespace and directory space is provided by the legacy adapter 285 for the CMA to abstract the legacy storage interface from the native storage. There can be multiple landing pads 210, 215 in multiple POPs 120 for a given customer to provide an ingest point for content objects.

A content directory 205 is provided for the CMA to allow locating, processing and storing content. The content directory 205 includes a metadata directory 275 and a content mapper 220. The metadata directory 275 manages through selection of resources and bricks that are members of tag and tagset groups, which resources and bricks are selected for particular processing task. The content mapper 220 is just a database storing UUID and corresponding path and filename along with the brick addresses that store the file referenced by a particular UUID. The health of bricks 130 and resources 134, metadata, tags, and other information is maintained by the metadata directory 275. All bricks 130 and resources 134 have various tags associate with them. For each tag or tagset, the bricks 130 or resources 134 that have that tag or tagset are known to the metadata directory 275 to allow selection of a brick 130 or resource 134 for a particular processing task performed on a content object.

The content mapper 220 is a distributed database or data structure that translates path and filename to a universal unique identifier (UUID). In this embodiment, the UUID is a 256-bit number that is randomly, pseudorandomly, sequentially, or unpredictably assigned to each content object file stored in the CDN 110. It is extremely unlikely that two files would have the same UUID and a check could be performed prior to assignment to be sure the UUID generated hasn't already been used within the CDN 110.

A policy reconciliation service (PRS) 260 maintains and processes policies. Each policy defines processing to perform on one or more content objects. The operation of a policy is affected by criteria based upon metadata and tags/tagsets. Where there are multiple policies applicable to content, the PRS disambiguates the situation based upon a hierarchy or by picking the lowest or highest common denominator for the applicable policies.

Within each POP 120 or elsewhere in the CDN, there are a number of bricks 130 that store content objects and resources 134 that process the content objects. A policy can define the classes of bricks suitable for storage and the processing that a resource 134 would perform on a content object. Parameters are passed to a resource 134 using a mutator that is part of a policy.

Figure 2B:
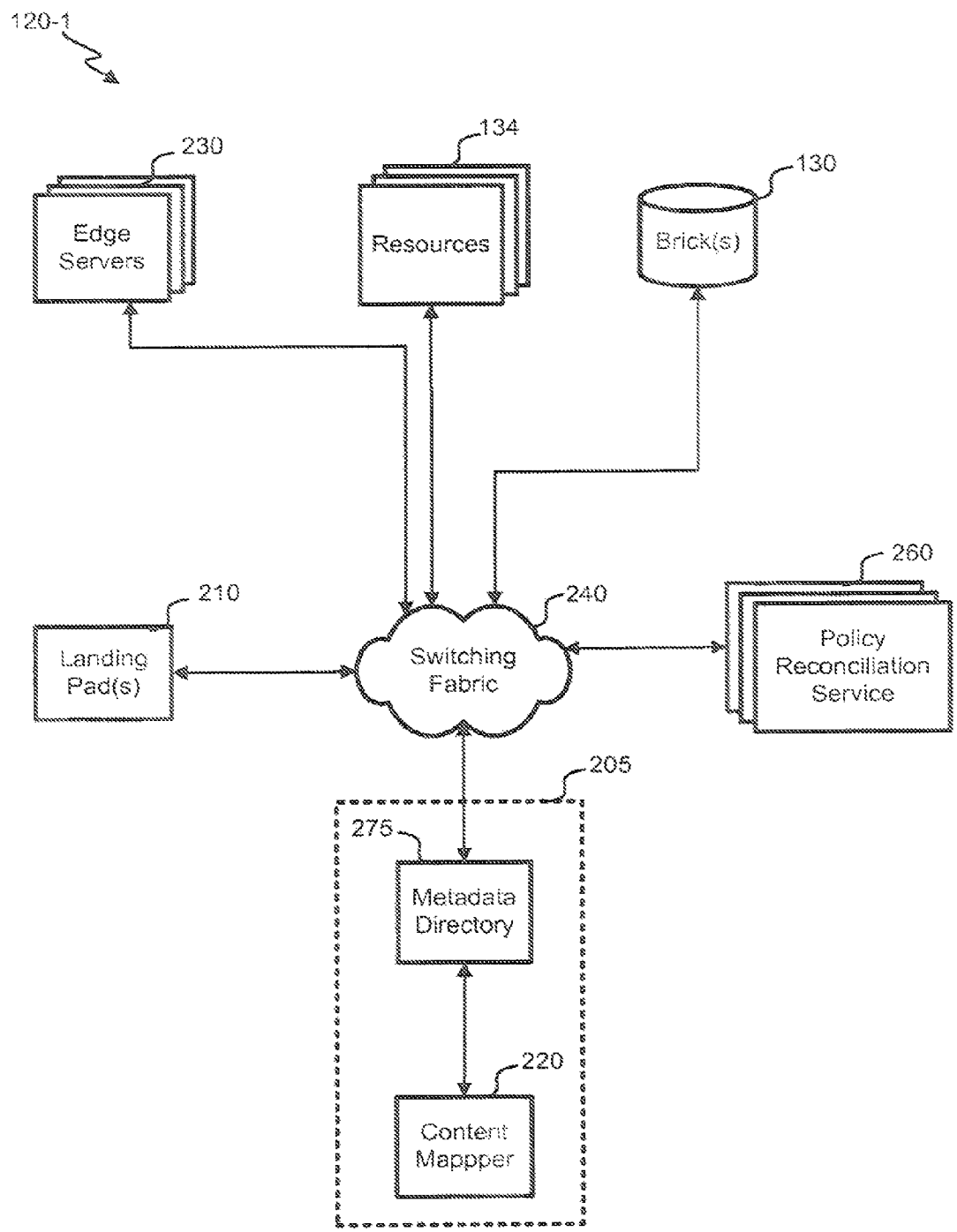

With reference to FIG. 2B, a block diagram of an embodiment of a POP 120-2 is shown. The edge servers 230 and landing pads 210 in this embodiment natively support the CMA without any translation or interfaces required. Calls are made to the content directory 205 to find the UUID for a content object and the brick names or identifiers that hold the content object. When storing content objects, the content directory 205 uses the tags and metadata to choose one or more bricks 130 that would store a particular content object.

Figure 3A:
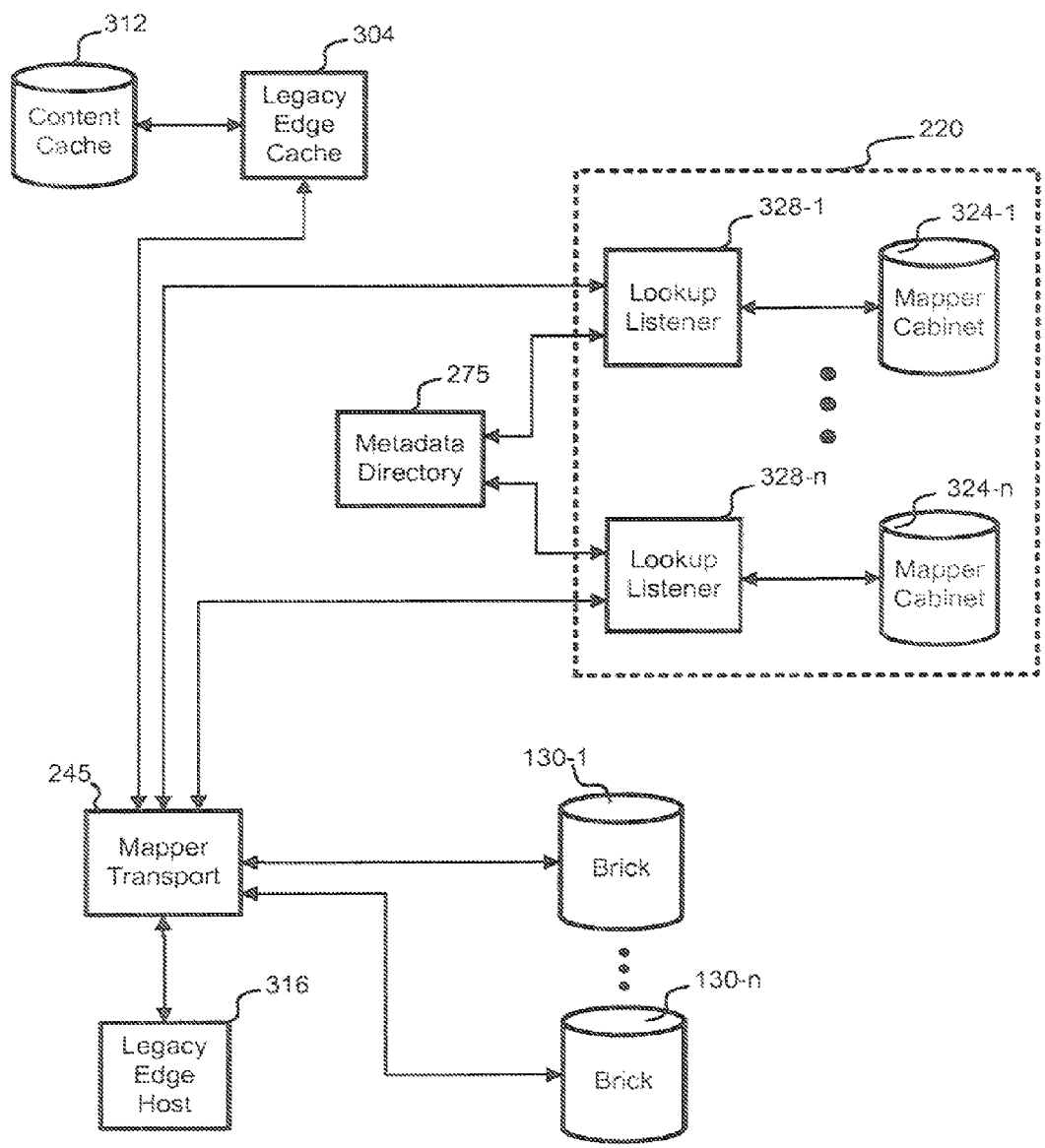
FIGS. 3A and 3B depict block diagrams of embodiments of a content management architecture.

With reference to FIG. 3A, a block diagram of an embodiment that shows portions of a content management architecture (CMA) using legacy edge servers 235. This embodiment has only legacy edge hosts 316 and legacy edge caches 304 instantiated on the legacy edge servers 235. Other embodiments could additionally include edge caches and/or edge servers that natively support the CMA.

When a content object or portion thereof is not found on the legacy edge server 235, reference to a mapper transport 245 is made. The mapper transport 245 acts as an origin server for all the content in the CMA. The mapper transport 245 interacts with the lookup listeners 328 to get names or addresses of the bricks 130 that hold the content object along with its UUID. The mapper transport 245 then proxies the content object back to the requesting legacy edge cache 304 or legacy edge host 316. The protocol and handshaking expected by the legacy edge cache 304 or legacy edge host 316 is performed by the mapper transport.

The metadata directory 275 and content mapper 220 collectively form the content directory 205. The metadata directory 275 translates a path and filename to a UUID when originally storing a content object. To find out a UUID or brick addresses, the path and filename is sent to the content mapper 220, by multicasting using multiple unicast channels to some or all the lookup listeners 328. The namespace is divided between the lookup listeners 328 in addition to having multiple alternative lookup listeners 328. Multiple lookup listeners 328 that receive the request will respond, but the requester only uses the first lookup listener 328 to respond. Where there are multiple lookup listeners distributed around the CDN, a distributed database protocol is used to keep all of them reconciled.

The mapper cabinet 324 stores the UUID and brick names or addresses for each path and filename combination. The lookup listener 328 queries the mapper cabinet 324 with the path and filename, to get the UUID for that path and filename that is returned with all the brick names that hold the content file. The lookup listener 328 with the answer passes the UUID and brick information back to the mapper transport 245. Where there are multiple bricks 130 with the UUID, the mapper transport 245 chooses one and confirms it is there. Additional, bricks 130 could be queried if unsuccessful. The mapper transport 245 proxies the content object back to the requesting legacy edge cache 304 or legacy edge host 316, but other embodiments could redirect the request directly to the brick 130.

Figure 3B:
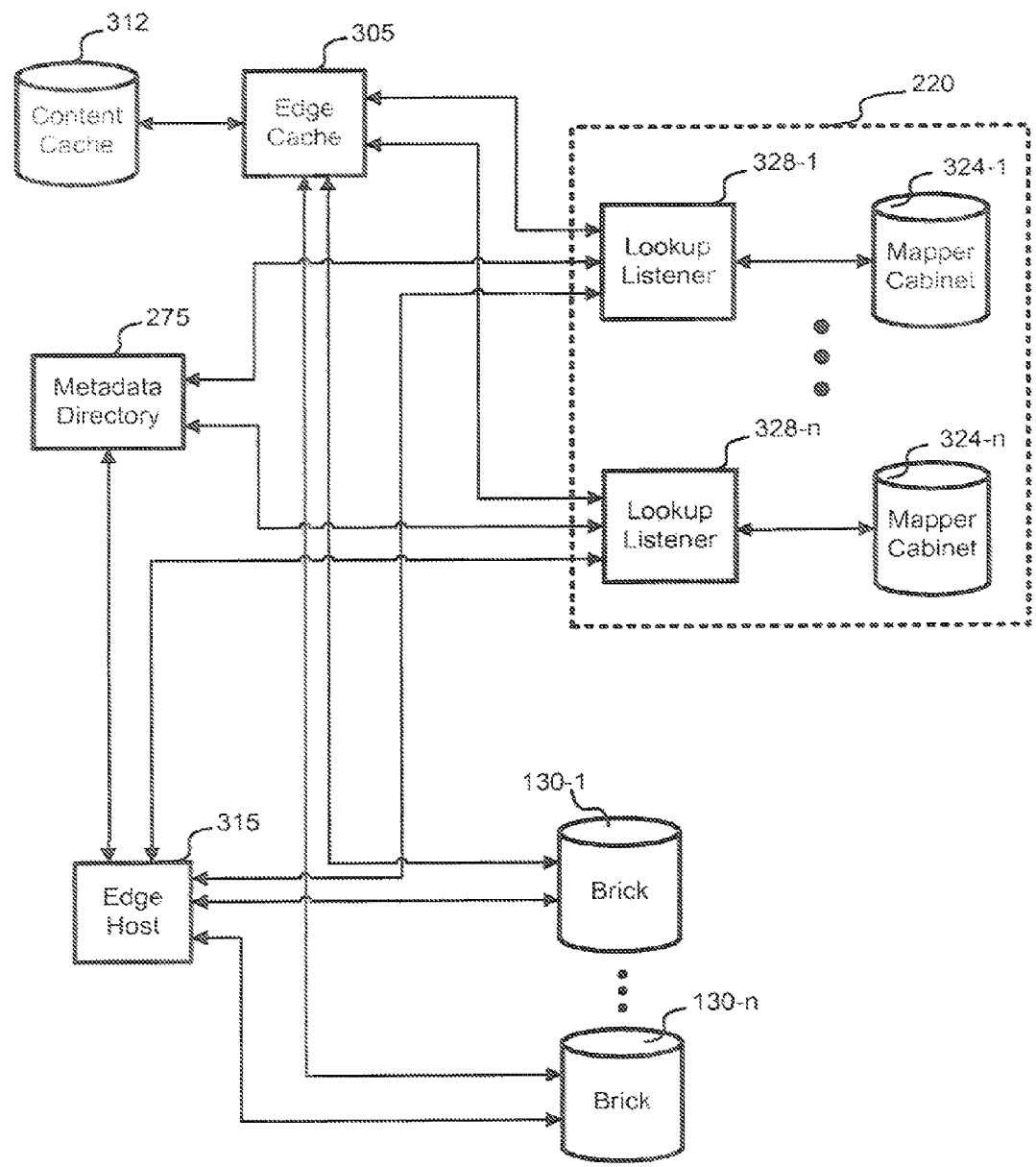

With reference to FIG. 3B, a block diagram of another embodiment that shows portions of a CMA. This embodiment uses edge caches 305 and edge hosts 315 that support the CMA. Where the content object is not found locally, the edge server 230 will request the path and file from the content mapper 220. Through multicast to the lookup listeners 328, one with the answer returns it after a query to its respective mapper cabinet 324. The edge server 230 can make an educated guess on what lookup listeners 328 are likely to respond first instead of querying all of them within the CDN each time. The guess could be based upon which returned answers quickly in the past or based upon an estimate of the closest ones in a network sense.

The UUID and brick names or addresses are returned by the content mapper 220 to the edge server 230. The edge cache 305 or edge host 315 can directly request the content object from a brick address by providing it the UUID. Where there are multiple bricks with the content object, they could be queried according to different schemes, for example, querying in parallel or sequentially. The bricks 130 may be inside or outside the CDN 110. Where a name of a brick is returned instead of an address, a domain name lookup service could be used to find the address.

Figure 4A:
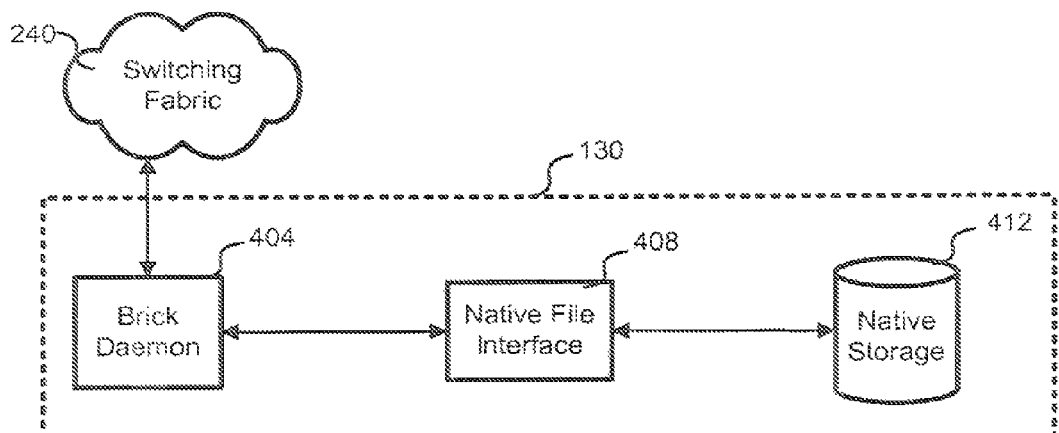
FIGS. 4A and 4B depict block diagrams of embodiment of a content brick or resource.

Referring next to FIG. 4A, a block diagram of an embodiment of a content brick 130 is shown. A brick 130 is connected to the switching fabric 240 in some way to be managed the CMA. The brick daemon 404 is a software layer that is between the switching fabric 240 and the native file interface 408 to translate communication with the CMA to allow storage on the native storage 412. Since there are many native file interfaces and host platforms, the brick daemon 404 is customized for the host platform. This embodiment of the brick daemon 404 only does translation, but other embodiments could perform authentication and/or encryption. Files are stored on the native storage 412 with the UUID as the file name.

Figure 4B:
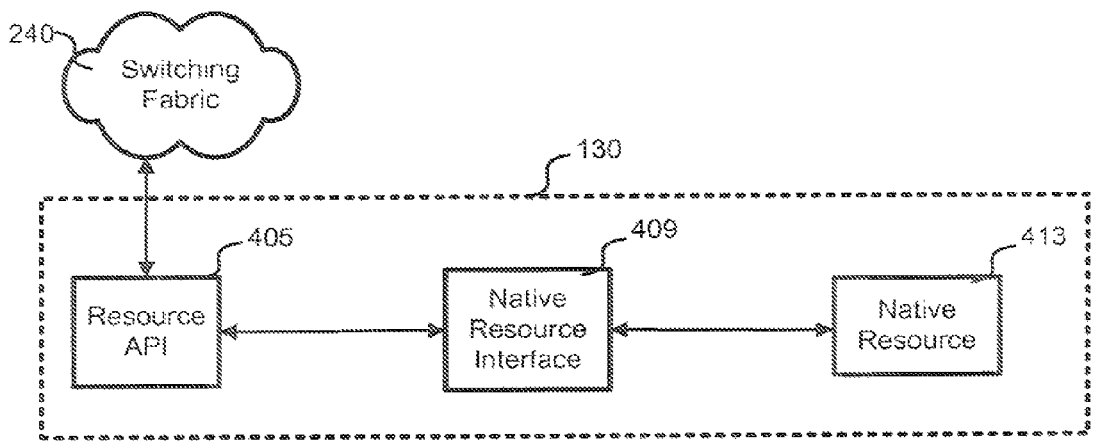

Referring next to FIG. 4B, a block diagram of an embodiment of a resource 134 is shown. The resource 134 could be any hardware or software that processes a content object. A resource API 405 receives mutators and other commands. The resource API 405 interfaces with a native resource interface 409 to command a native resource 413 to perform processing on a content object. In some cases, the resource 134 has a native API the is suitable for integration with the CMA without the need for a resource API layer.

Figure 5:
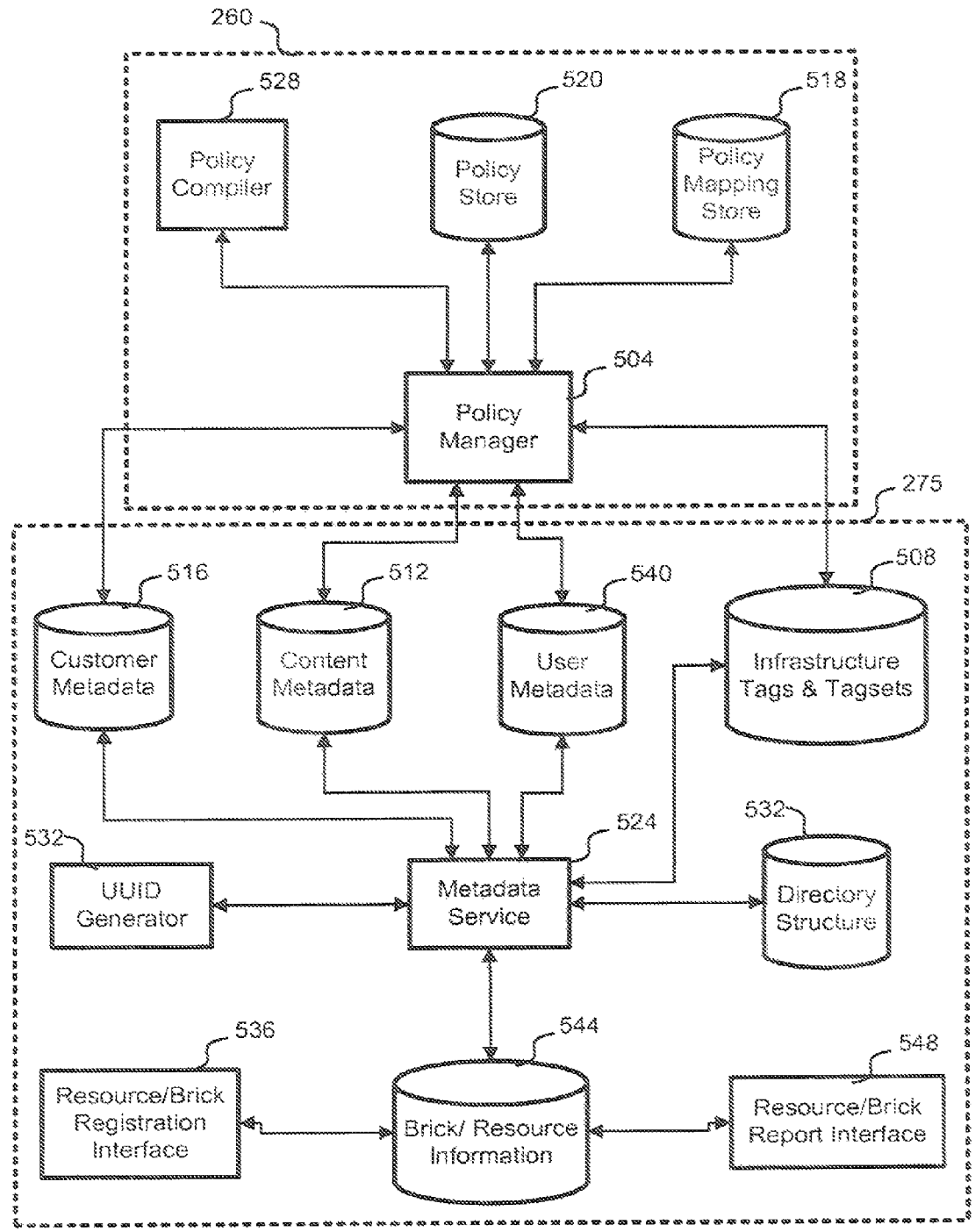
FIG. 5 depicts a block diagram of an embodiment of the policy reconciliation service interacting with a metadata directory.

With reference to FIG. 5, a block diagram of an embodiment of the PRS 260 interacting with a metadata directory 275 is shown. The PRS 260 includes a policy manager 504 that controls a policy compiler, a policy store 520, and a policy mapping store 518. The policy compiler 528 performs disambiguation to resolve conflicts when multiple policies apply to the same content object. Conflicts can be resolved by a hierarchical scheme where policies higher in the hierarchy take precedence. In another embodiment, the policy compiler chooses the most or least stringent of the conflicting policies. For example, a policy that requires all JPEG files be deleted after two weeks and another policy that requires all files to be deleted when not requested for a day could be resolved either most stringently to delete the JPEG file after not being used for a day or least stringently to be deleted after two weeks. Additionally, any syntax errors in the policies are found and identified by the policy compiler 528.

The policy store 520 holds all the policies in the CMA. The policies are applicable to many customers and each have various levels of alterations for a particular customer. There are policies for ingest, replication, hosting, transcoding, encryption, compression, thumbnailing, various workflows, aging content in/out of system, and other processing for a content object. Each policy is a function with defined with PRS parameters that include criteria, variables, storage disposition and optional mutators. Table I below shows examples of some policies with the PRS parameters that implement the policy and the variables used. For example, a transcode policy retrieves a source URL and places it in an intake subdirectory for the transcoder. The transcoder performs any number of different transcodes on the source files as specified and stores the resulting files as the specified transcode URLs.

TABLE I

Example Ingest and Hosting Policies

| Policy | PRS Parameters | Variable(s) |
| --- | --- | --- |
| Ingest | Ingest API Information | Origin URL, Content Tags, Transcode Options, Storage Options, Purge Date |
|  | Transcoder Format(s) | Transcode Options, URL, Content Tags |
|  | Store File(s) | File Name, Storage Options |
|  | Automatic Purging | Purge Date |
| Replication | File Copy | Number of Copies, Content Tags, Infrastructure Tags |
| Transcode | Retrieve Source n Transcodes | Source URL Transcode Options, Different Transcodes, Source URL, Content Tags |
|  | Store Results | Transcode URLs |
| Host | Hosting API Information | Origin URL, Content Metadata, Customer Metadata, Storage Options, Purge Date |
|  | Store File(s) | Stored URL, Storage Options |
|  | File Aging | Purge Date |

Policies are preformulated or custom designed by content providers or content receivers. The policy could be in any format (e.g., XML, text, etc.) and could be command line instructions, run-time executed source code or compiled into object code. Policies can age into or out of system. A PRS parameter acts as an instruction in a CDN-specific programming language. A policy can be assigned to an end user who receives content, a customer who provides content, a content object, a class of content objects, a directory, and/or any other tag or metadata demarcation.

Criteria for a policy define its applicability to the content objects in the CMA. Criteria allow size-based processing, MIME type workflows, or any metadata or tag qualifier before performing the policy. For example, a compression policy could be applied to a particular MIME type stored in a particular POP that has not been requested for some period of time.

Each policy has PRS parameter that defines a disposition for the content object to be performed after any processing. The disposition can say what type bricks 130 or resources 134 to use. The number of copies of the content object to have and what geographic spread to place on those copies can also be defined. A deletion date can be defined in the PRS parameter.

A mutator indicates a resource 134 that will process the content object. The API to the resource typically includes the source path and filename for content file and any number of variable that affect processing by the resource 134. The mutators are in the form of a URL in this embodiment, but other embodiments could use any format. The mutator URL identifies the address of the resource 134, a source content object location that is being operated upon and a number of variables. The mutator URL can perform conditional actions based upon prior mutators and/or variables.

The functionality of a policy is demonstrated with an example thumbnailing policy that uses a thumbnailing resource to create thumbnail images for an image content object. In this example, the policy would store any files which end in the file name extension is 'jpg' in three different locations. One of the locations is in the European Union and two are stored in the United States. Once all copies have been made, a call to the thumbnailer resource 134 is made, which generates a small thumbnail image of the source JPEG file that is stored in a predetermined location. The thumbnailer resource 134 uses the pathname of the source JPEG file as well as its size in bytes passed as variables in the mutator URL. The thumbnailer resource 134 is an HTTP-based API which is called with this URI: http://www.imagetransform.org/thumbnailer?path=<full path to source image>&size=<size of image>. The resource is located at the address of the imagetransform.org domain, which may or may not be within the CDN 110.

In this example, all known bricks 130 have infrastructure tags 508 for their geographical locations (e.g., city, metropolitan area, country, supranational entity). For example, a brick 130 in London would be tagged with the tags LONDON, UK, EU, and EMEA. A brick in 130 Paris would be tagged with PARIS, FRANCE, EU, and EMEA. A brick 130 in Chicago would be tagged CHICAGO, IL, USA, NA, and AMERICAS, and so on.

The one or more databases or data structures hold the infrastructure tags and tagsets 508 and addresses of all bricks 130 or resources 134 that comply with each tag or tagset. The tagset could be named to be the same as the tag, by convention, i.e., LONDON, USA, etc. Tagsets could be conjunctions of two or more tags. For example, a tagset called LOND-HPERF could contain both the LONDON and HIGH-PERFORMANCE tags. A query to the metadata service 524 for a given tag or tagset would return all bricks 130 and resources 134 that have the tag(s).

All known bricks 130 or other resources 134 are arbitrarily grouped with a tagset having any number of tags. For geographic tags, a brick 130 cannot be in London and somewhere else at the same time, so generally a geographic tag are not conjoined with other geographic tags in a tagset. Not all the tags which exist need to be in a tagset—some might be reserved for future use. Similarly, not all tagsets need be utilized in any policy.

This example policy is expressed in a pseudo language below as four PRS parameters. The first PRS parameter is the policy name. For the second PRS parameter, one or more criteria can be specified as positive or negative logic to test for a condition before applying the policy. In this example, the criteria defines applicability to content files of the JPG MIME type. The disposition in the third PRS parameter is the storage conditions specifying tags and the minimum number of copies.

Policy: "ExamplePol"
Criteria: [{name='.*.jpg$'}]
Disposition: [{Tagset="USA", MinBricks=2}, {Tagset="EU", MinBricks=1}]
Thumbnail Mutator=[http://www.imagetransform.org/thumbnailer?path=%p&size=%s]

In order to decide the applicability of this policy, the PRS 260 would first would look at the name extension of the file as a criteria. If it matches the regular expression '.*.jpg$' (that is, it ends with the text 'jpg'), then this policy applies. Any other files would not be deemed to be covered by this policy.

When executing the policy, the PRS 260 would select two bricks which have all the tags in the tagset USA, and one brick from the set which have all the tags in tagset EU. The bricks could be chosen by any criteria such as randomly, round robin, available space, cost of storage, proximity in network terms, bandwidth cost to transport the file, etc. Once three receipts come back from those bricks marked COMPLETE, the source JPEG file itself goes into the COMPLETE state, and the thumbnail mutator in the PRS parameter list gets called, substituting the metavariables %p with the full path to the object, and %s with the size in bytes of the image object. Other policies could have any number of mutators for storage, transcoding, replication, or other processing for a file or asset.

The policy mapping store 518 records which policies are mapped to various levels of the hierarchy. Various embodiments could map policies to the national jurisdiction, regional jurisdiction, CDN-wide, POP-applicable, customer, sub-customer, directory, sub-directory, MIME-type, individual file, etc. to achieve any level of granularity. FIGS. 12A, 12B and 12C, show embodiments of a different policy prioritization hierarchies 1200. Each block represents a level in the hierarchy and can have a number of policies assigned to it. The policies for a particular level can be organized in a priority as between the others at that level. Policies in a higher block take precedence over those in a lower block during the disambiguation processes performed by the policy compiler 528. The present embodiment only has two levels in the hierarchy as illustrated in FIG. 12A. Some policies disassociate themselves with a particular level of the hierarchy once performed.

For example, a policy could be used to update coding on the content library from a legacy format where all new content is received in the updated coding. After running the policy once, it can be disassociated from the customer with a PRS parameter in the policy that removes the association in the policy mapping store 518.

Figure 6:
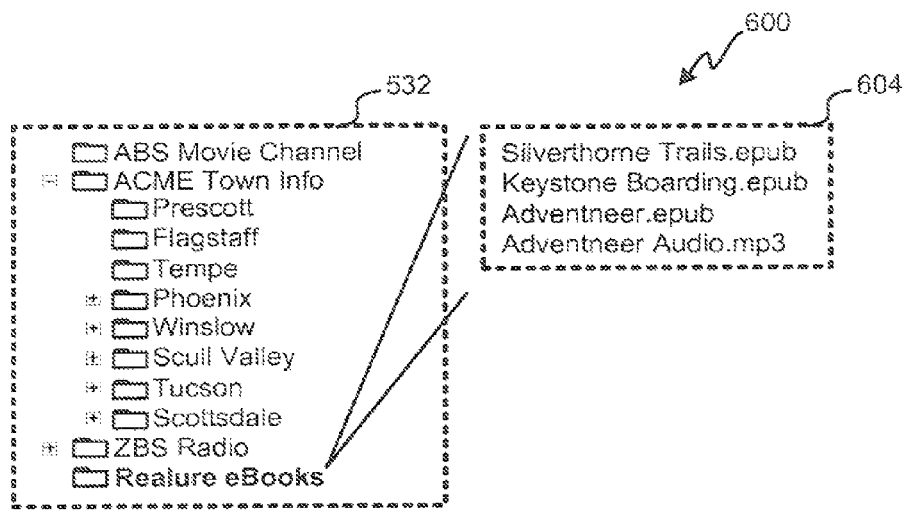
FIG. 6 depicts a diagram of an embodiment of a directory structure.

The directory structure 532 for this example is illustrated in FIG. 6 where each customer has a directory with optional subdirectories. Each directory or subdirectory can hold file names 604 for content objects of the customer. The directory structure 532 is stored in the metadata directory 275 in this embodiment. Table II shows an example of a portion of the policy mapping 518 for the hierarchy in FIG. 12A and the directory structure of FIG. 6. The /ZBS_Radio client has subdirectories for /streams and /podcasts. All the files in the /ZBS_Radio/streams path has both ingest and host policies that are applied, while all the files in the /ZBS_Radio/podcasts path has ingest, transcode and host policies that are applied.

TABLE II

Policy Mapping

| Directory | Subdirectory | File | Policy |
|---|---|---|---|
| ABS Movie Channel | — | — | Ingest, Replication, Host |
| ... | ... | ... | ... |
| ZBS Radio | Streams | — | Ingest, Host |
|  | Podcasts | — | Ingest, Transcode, Host |
| Realure eBooks | — | Silverthorne Trails.epub | Ingest, Replication |
|  |  | Keystone Boarding.epub | Ingest, Replication |
|  |  | Aventneer.epub | Ingest |
|  |  | Aventneer Audio.mp3 | Ingest, Replication, Transcode |

A UUID generator 532 assigns a 256 bit code to each path and filename stored in the CMA. The UUID becomes the file name for content objects stored with the various bricks 130 associate with the CMA. The UUID is a one-way function in that the path and file name cannot be determined from the UUID alone, but a query to the mapper cabinet 324 can give the bricks storing a particular UUID and the path and file name.

The metadata directory 275 maintains metadata, tags and tagsets that are used by the policies to process content objects. There is customer metadata 516 describing details about the customer. The customer metadata 516 is entered when the customer configures their account with the CDN and includes account holding personal information, account, any sub-account(s), zone, channel, confidentiality level, etc. The directory and subdirectory structure for a customer is stored in the directory structure 532 in this embodiment, but could be stored with other customer metadata 516 in other embodiments.

Also stored is user metadata 540 that is discerned about the end user 128. Typically, the end user 128 does not intentionally interface with the CDN 110 so the user metadata 540 is largely discerned indirectly. Metadata includes usage habits, content preferences, demographic information, user identifier, POP location receiving request, and end user system location. The content player, IP address, cookies or other techniques may be used to discern one user from another. Privacy concerns can limit the availability of user metadata 540.

Infrastructure tags and tagsets 508 are assigned to bricks 130 and resources 134. The number of tags increase as customers want greater granularity in applying policies. Infrastructure tags include: carbon use, energy use, storage type (e.g., solid state, magnetic, optical, spinning, tape), equipment manufacturer, reliability (e.g., dual-location replication, RAID level, tape archive), write only, write once, interface speed (e.g., SATA, SAS, Ethernet, 10 Gb), retrieval latency, storage cost, physical security surrounding equipment, geographical location of content, various performance discriminators, equipment location to city, region, or country, POP, IPV4 or IPV6 compatibility, CDN hosted, user hosted, level of QoS. The tags can be applied to bricks and resources regardless of them being inside or outside the CDN 110.

Content metadata 512 relates to content objects with the CMA. The content metadata 512 can additionally be stored in the content object itself and/or its file name. The content metadata includes MIME type, encoding, container format, copyright terms, cost terms, copyright year, actors, director, studio, program summary, content rating, critical review ranking, title, transcript, ad insertion locations, encryption, request popularity, etc. Some content metadata 512 is not stored in the database or store, but is discerned through interaction with the content file. For example, MIME type is readily discernable from the file itself without refereeing the content metadata 512 in the store or database.

Bricks 130 and resources 134 are expressly enrolled to work with the CMA. A registration interface 536 is used to enter the address or domain name for the brick 130 or resource 134 that is stored in a brick/resource information store 544. The bricks 130 and resources 134 periodically report health and status information through a report interface 548 that is also stored in the brick/resource information store 544. The metadata directory 275 can periodically request status and health information using the report interface 548 or can test the brick 130 or resource 134. Where calls to the brick 130 or resource 134 fail or perform poorly, the brick/resource information 544 can be updated to reflect status.

Figure 7:
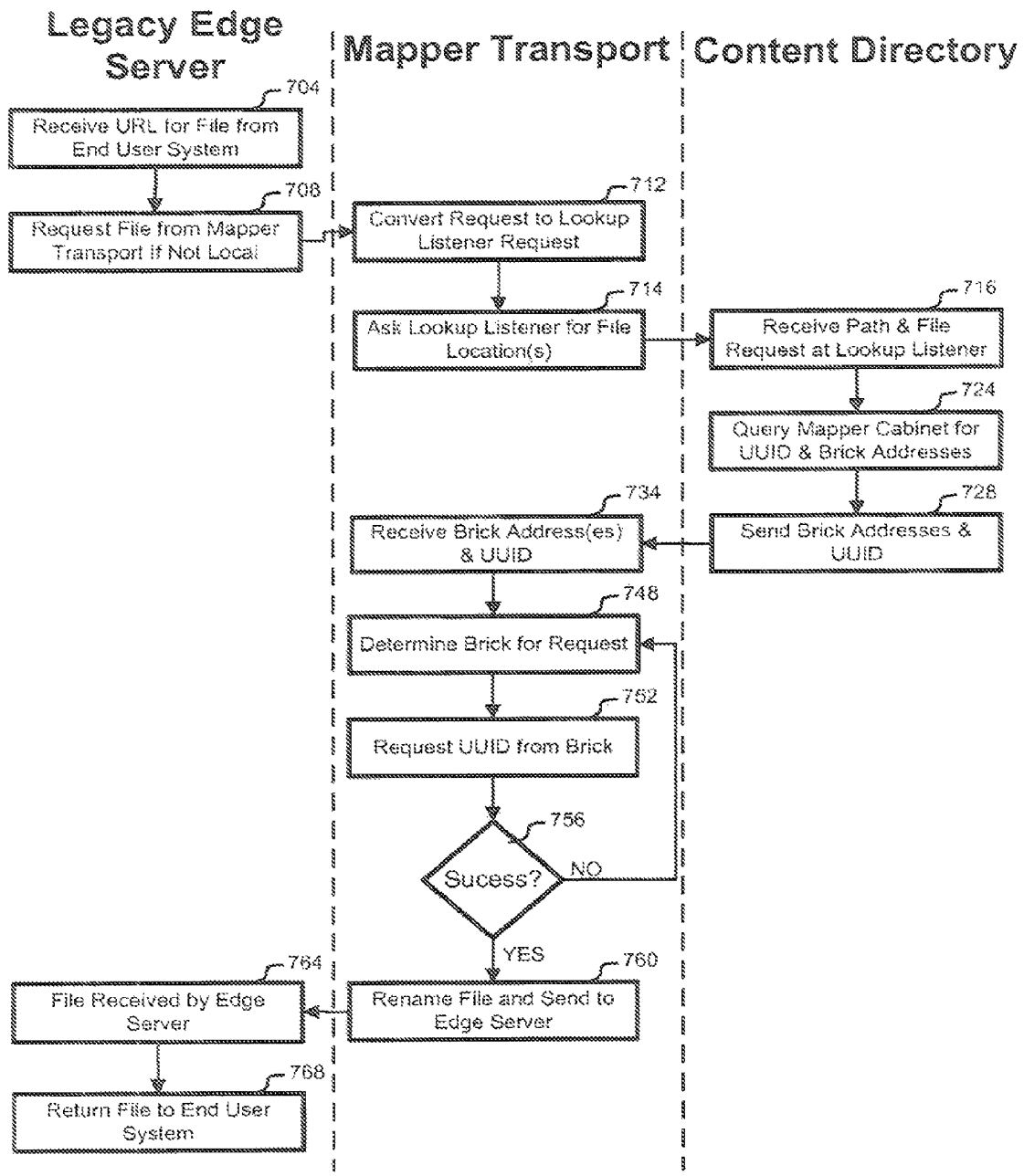
FIGS. 7 and 8 illustrate swim diagrams of embodiments of a process for using the content management architecture to retrieve a content object.

With reference to FIG. 7, a swim diagram of an embodiment of a process for using the CMA to retrieve a content object with a legacy edge server 235 is shown. The depicted portion of the process begins in block 704 where the end user system 102 requests a file from an the legacy edge server 235. Where the legacy edge server 235 cannot fulfill the request, the file is requested from the mapper transport 245 in block 708. The request from the legacy edge server 235 is typically a URL which is converted by the mapper transport 245 in block 712. A multicast query is made to the lookup listeners 328 in block 714 that is received in block 716. To achieve parallel requests to the lookup listeners 328, multiple unicast requests are made overlapping in time.

In block 724, a query is made from the lookup listener 328 to the mapper cabinet 324. The first lookup listener 328 to find the result in its respective mapper cabinet 324, responds to the mapper transport 245 with the brick addresses and UUID in block 728 that receives them in block 734. The mapper transport 245 determines which of the brick addresses to use where there are multiple ones in block 748. The determination can be random or according to some other scheme. The UUID is requested from the address of the selected brick in block 752. If unsuccessful as determined in block 756, another address is attempted by looping back to block 748.

Where the file with the UUID for the name is found on the brick 130, the file is renamed and sent to the legacy edge server 235 in block 760. The file is received in block 764 and returned to the end user system 102 in block 768. In this way, the CMA is used like an origin server by any legacy process with the mapper transport 245 translating the interaction.

Figure 8:
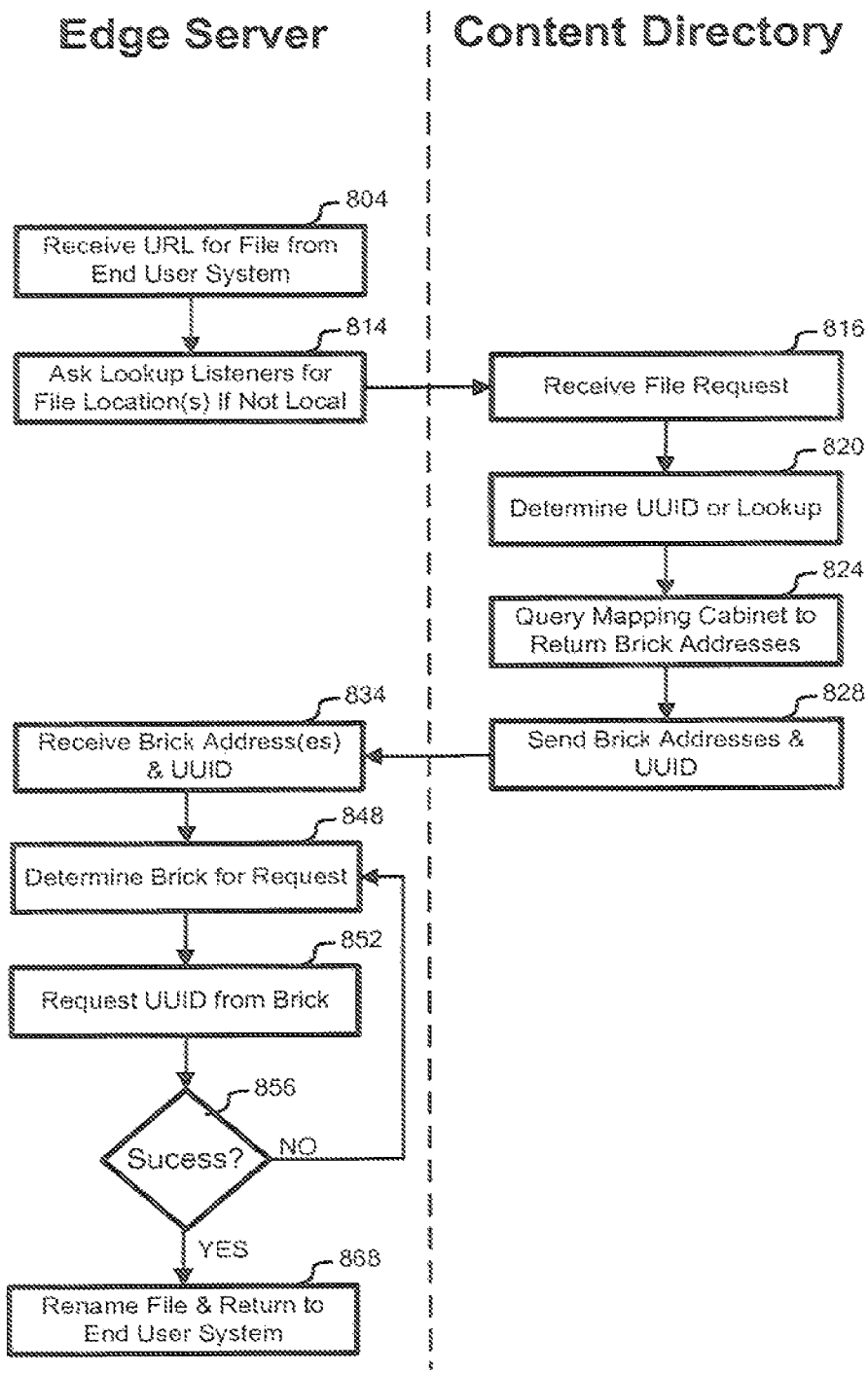

Referring next to FIG. 8, a swim diagram of another embodiment of a process for using the CMA to retrieve a content object is shown. This configuration does not use the mapper transport 245 as the edge server 230 knows how to interact with the content directory 205 directly. In block 804, a request for a file is made by the end user system 102 to the edge server 230. The path and filename is requested using multicast to the lookup listeners 328, where the content object is not found on the edge server 230 in block 814. The content directory 205 receives the request in block 816, determines or looks-up the UUID in block 820 and the brick names in block 824 from the mapper cabinet 324 to respond first with the answer.

The brick addresses and UUID are sent by the content directory 205 in block 828 and received by the edge server 230 in block 834. The edge server 230 determines which brick address to try first in block 848 before requesting that UUID from the brick 130 in block 852. If not found in block 856, another brick address is attempted by looping back to block 848. Where the file is found in block 856, it is renamed and returned to the end user system 102 in block 868.

Figure 9:
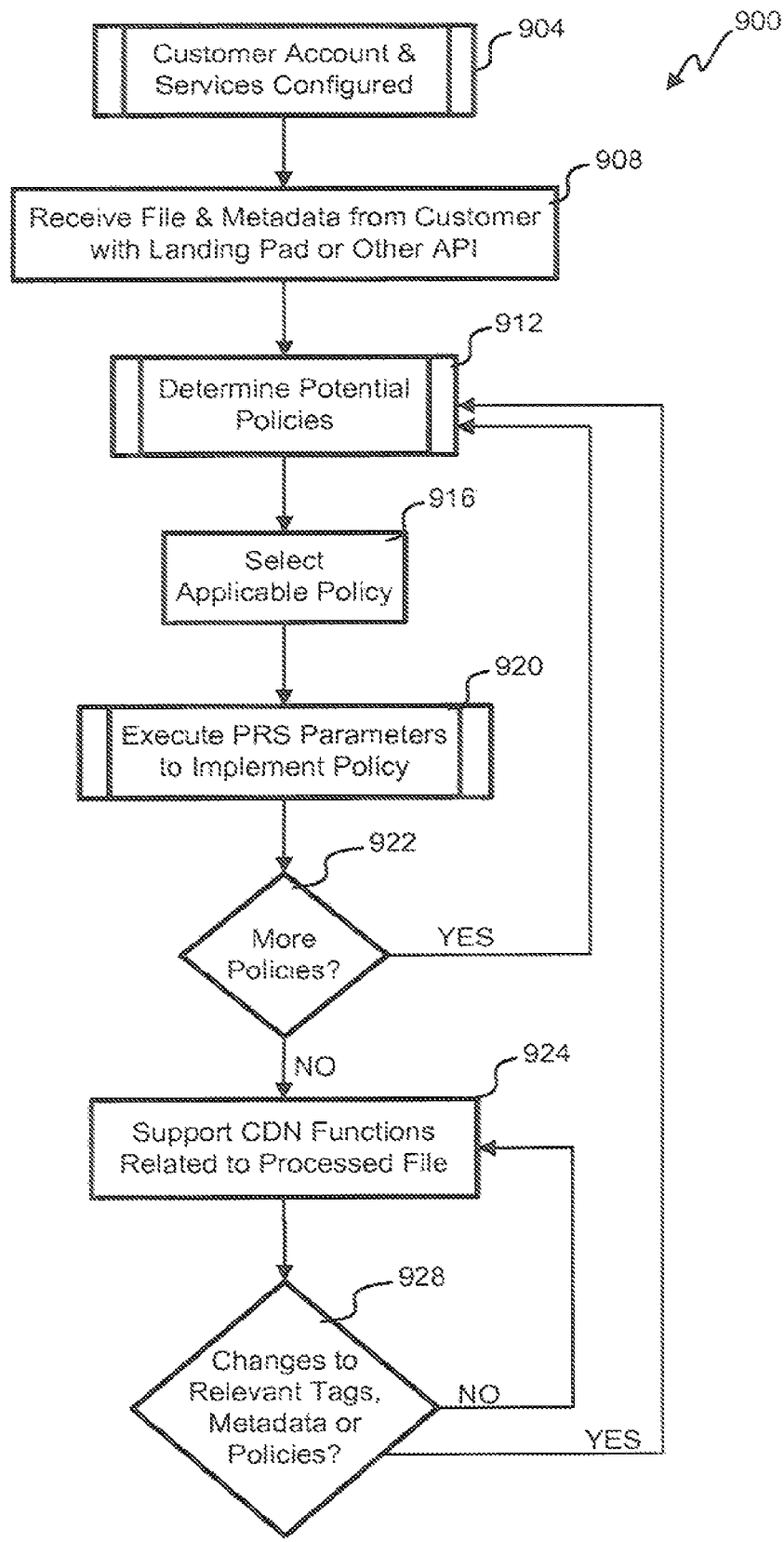
FIG. 9 illustrates a flowchart of an embodiment of a process for applying policies to a content object.

With reference to FIG. 9, a flowchart of an embodiment of a process 900 for applying policies to a content object is shown. The depicted portion of the process begins in block 904, where the customer account, services and policies are configured, which is explained in greater detail in relation to FIG. 10 below. In block 908, a content object file is received from the customer using a landing pad 210, 215 or other API. Some embodiments can add content object files when requested from the CDN 110 and are located after a cache miss. Other embodiments can designate a path that is automatically reconciled with the CDN 110 using a policy.

Some policies are triggered by an action such as intake, user request, or other action that would affect the content object file. Other policies are run periodically or according to a schedule, for example, checking a directory for newly encoded files and moving the file back out to the origin server 112 of the content originator 106. In any event, the potential policies are determined in block 912, which is explained in greater detail in relation to FIG. 11. The policies generally applicable to the content file is determined by analysis of all policies associated with the hierarchy 1200 in block 916. Where there are more than one policy, a disambiguation process is performed by the policy compiler 528 to find the policy that has the highest priority.

In block 920, the policy is interpreted and performed. The policy is represented as a number of PRS parameters that are interpreted to perform some processing on the content object file. The functionality of block 920 is explained in greater detail in relation to FIG. 13 below. If there are more policies applicable to the content object file that are still waiting to complete as determined in block 922, processing loops back to block 912. The just performed policy may have changed the content object file such that it qualifies for more or less policies so that is reanalyzed in block 912. At some point, it is determined block 922 that all policies have been performed and the normal operation of the CDN 110 utilizes the content object file in its processed form is performed in block 924.

Upon changes to user, customer or content metadata 540, 516, 512 referenced in the applicable policies or tags 508 associate with where a content object file is stored, the policies are run again. For each content object, the relevant input metadata 512, 516, 540 or tags 508 used in the policies are tracked. Where there are changes to any of the metadata 512, 516, 540, tags 508 or policies as determined in block 928, processing loops back to block 912 to rerun the policies.

Figure 10:
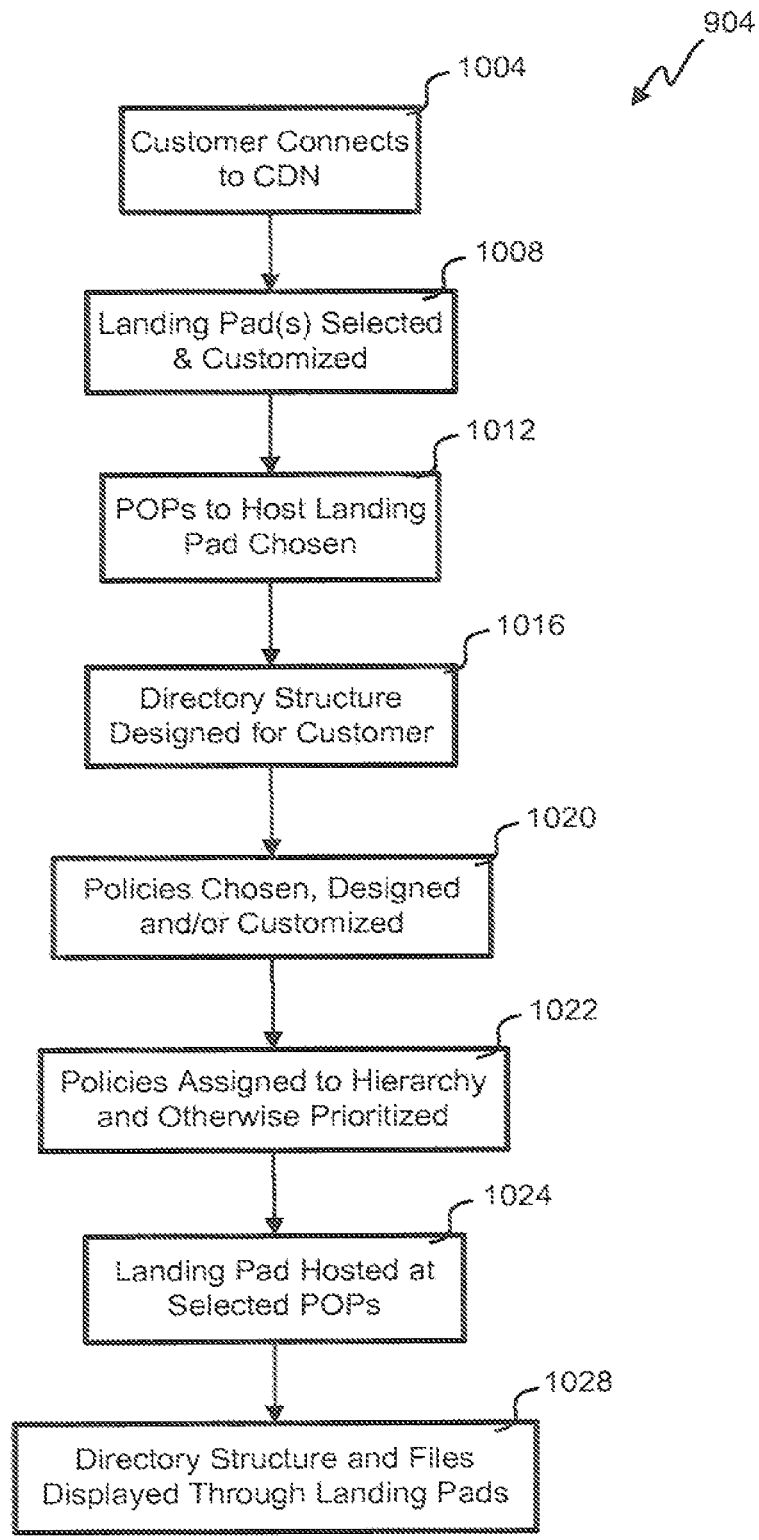
FIG. 10 illustrates a flowchart of an embodiment of a process for configuring a customer account.

Referring next to FIG. 10, a flowchart of an embodiment of a process 904 for configuring a customer account is shown. The depicted portion of the process begins in block 1004 where the customer connects to the CDN 110 and authenticates their identity. Certain demographic and payment options may be entered along with customer metadata 516. In block 1008, a landing pad 210 is selected and customized. A landing pad 210 is an ingest point and can be configured in any number of ways to efficiently provide content objects to the CDN 110.

In block 1012, the customer can choose the number of POPs and/or their location that will host the landing pad. The customer can select that each POP would have an instantiated landing pad 210 or instantiate one upon request. To provide for high volume accounts, there can be a number of landing pads per POP that even scales up or down with demand. The customer can design the directory structure 532 for their account by renaming directories and adding sub-directories nested down any number of levels in block 1016.

The customer can customize policy templates, design new policies or modify their existing policies in block 1020. The policies are mapped to the hierarchy 1200 in block 1022. Where there are multiple policies for a particular level in the hierarchy, they are put in order of importance to allow resolving potential conflicts during disambiguation. In block 1024, the landing pads 210 start normal operation at the selected POP(s) 120. The directory structure and loaded files for the customer can be viewed and modified through the landing pad in block 1028.

Figure 11:
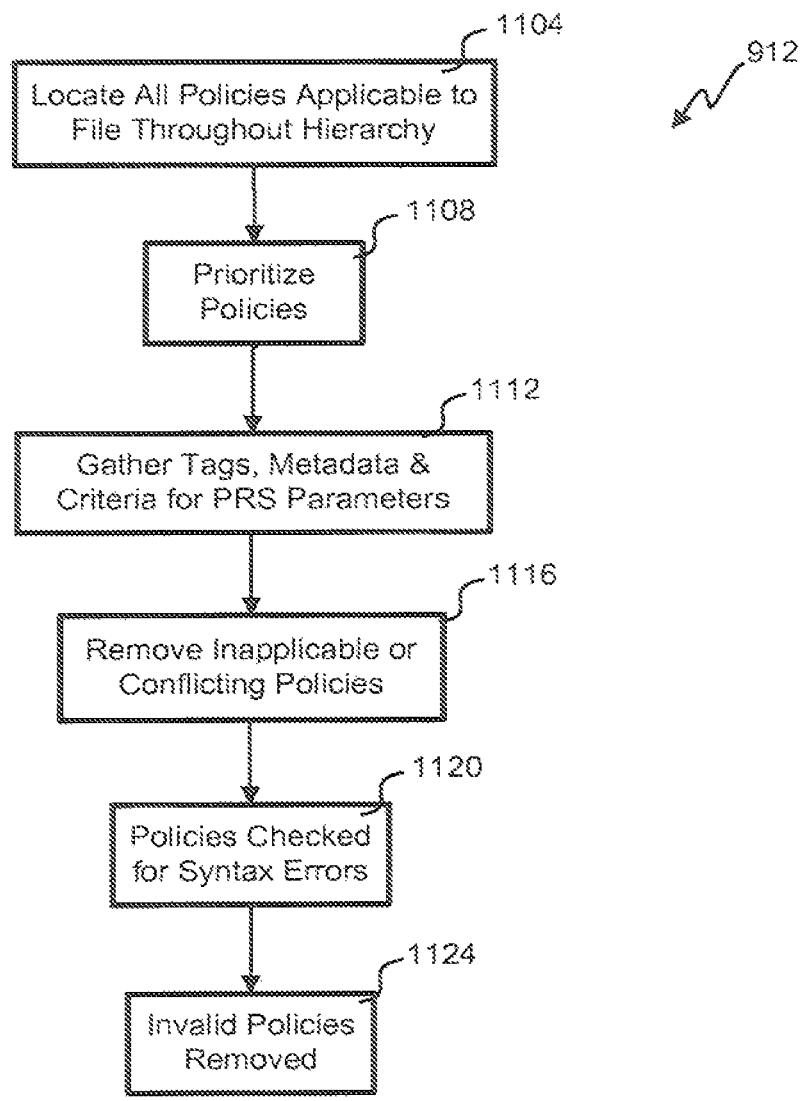
FIG. 11 illustrates a flowchart of an embodiment of a process for disambiguation of policies.

With reference to FIG. 11, a flowchart of an embodiment of a process 912 for disambiguation of policies is shown. The process 912 is best understood in reference to one hierarchy from FIG. 12A, 12B or 12C. The depicted portion of the process 912 begins in block 1104 where all policies possibly applicable to the file are found throughout the hierarchy. The policies are all prioritized in block 1108. The tags, metadata and criteria of the PRS parameters in the policies are gathered in block 1112. Criteria can and other filters in the policies can make many policies irrelevant to a particular content file.

In block 1116, the inapplicable and conflicting policies are removed from the list. Each policy has a criteria that may make the policy inapplicable to the file. Additionally, there can be conflicting policies where the lower priority policy is removed. The policy compiler 528 also checks for syntax errors or other problems in block 1120. The invalid policies are removed from the list in block 1124. The list of potential policies are known at the point so that the highest priority can be executed.

Figure 13:
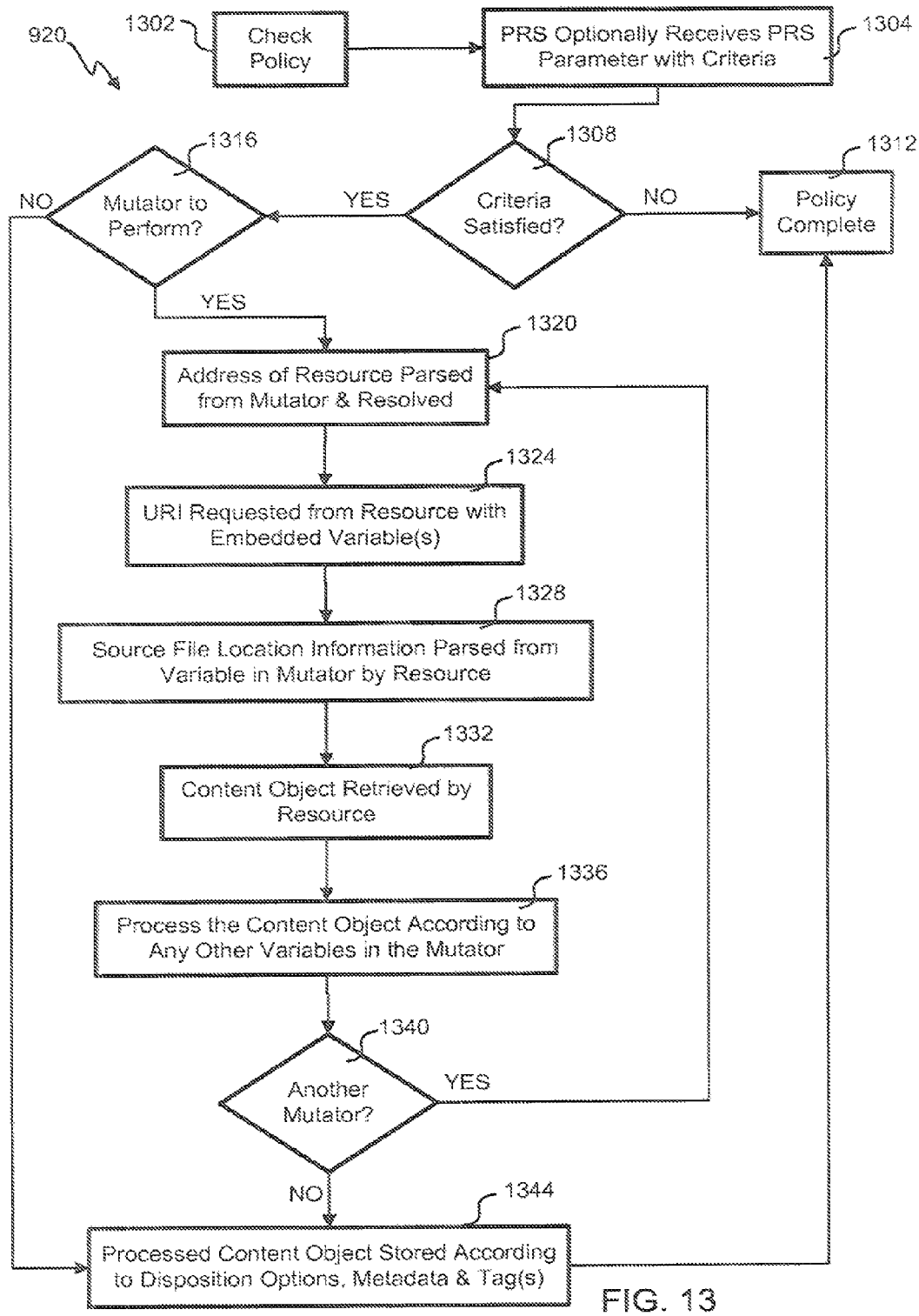
FIG. 13 illustrates a flowchart of an embodiment of a process for performing a policy.

With reference to FIG. 13, a flowchart of an embodiment of a process 920 for performing a policy is shown. The depicted portion of the process begins in block 1302 where the policy compiler 528 checks the policy for errors prior to running the policy after being loaded by the policy manager 504. The policy manager 504 checks the policy for any criteria identified in a PRS parameter. Where there is a criteria, a determination is made in block 1308 to see if the criteria is satisfied to allow further evaluation of the policy. Should the criteria exclude further processing, processing passes from block 1308 to block 1312 where processing of the policy is complete.

Should the policy criteria be satisfied in block 1308, processing continues to 1316 to see if there is a mutator PRS parameter in the policy. Where there is no mutator, processing goes to block 1344 where the content object a disposition PRS parameter defines how the resulting content object is stored. The storage may be dependent on variables, metadata and/or tags. The metadata directory 275 can be queried for bricks 130 that comply with a given tag that can be specified in the disposition PRS parameter to find the one or more bricks 130 to use. For example, the disposition could be to store the content object in three locations with a USA tag. A query would be made to the metadata directory 275 and it would choose three from all the bricks 130 with the USA tag and specify those bricks 130. The policy manager 504 would write the content object to the addresses specified by the metadata directory 275. Where there is one or more mutators as determined in block 1316, processing continues to block 1320.

In block 1320, the address of the resource is parsed from the mutator URL. Where the address is a domain name, that is resolved to an IP address using a domain name service (DNS). The resource 134 API uses a URL in this embodiment so that requesting the URL in block 1324 passes the source file location and other embedded variables. In some embodiments, the mutator specifies a group of resources that comply with a tag. The metadata directory 275 is queried to choose from the group of resources with the tag and return the address of the particular resource to use. For example, the mutator may specify using a transcoder service in Russia. The metadata directory would find all transcoder services with a Russia tag and return one. The one chosen could be random, round robin, based upon loading status from the resource information database 544 or some other algorithm.

The resource 134 parses the source file location from the URL in block 1328. The content object is retrieved by the resource 134 in block 1332. In block 1336, the resource 134 performs the requested processing according to any other variables passed in the URL or other API. If there is another mutator in the policy as determined in block 1340 processing loops back to block 1320 for processing. Where it is determined in block 1340 that there are no additional mutators in the policy, processing goes to block 1344 for execution of the disposition PRS parameter. In this way, a policy is performed to process a content object file.

Figure 14:
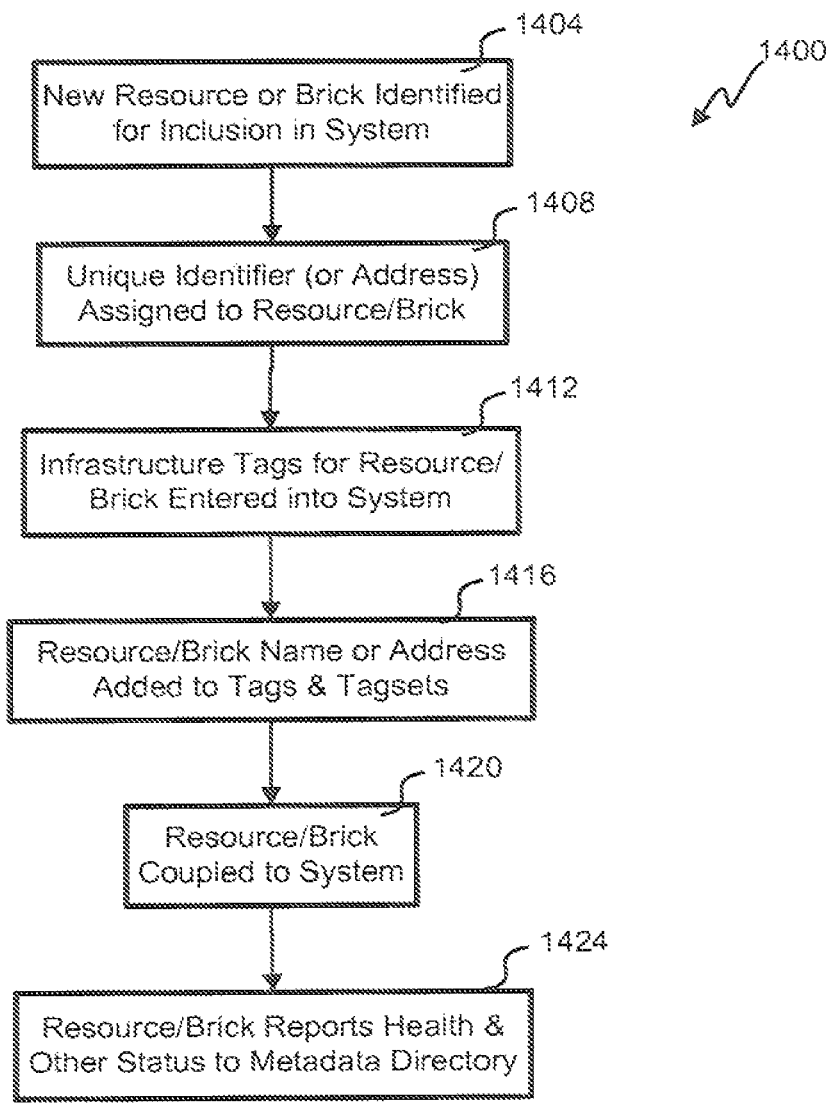
FIG. 14 illustrates a flowchart of an embodiment of a process for enrolling a resource or brick into the content distribution system.

Referring next to FIG. 14, a flowchart of an embodiment of a process 1400 for enrolling a resource 134 or brick 130 into the CMA is shown. The metadata directory 275 knows addresses for the enrolled resources 134 and bricks 130 along with the infrastructure tags 508 associate with each. The depicted portion of the process 1400 begins in block 1404 where a new resource 134 or brick 130 is identified for inclusion in the CMA. A unique identifier or name or an address is assigned to the resource 134 or brick 130 in block 1408. The address can be a virtual one that is resolved through DNS. Infrastructure tags for the new enrollee are entered into the CMA in block 1412.

The resource 134 or brick 130 is added to the tag or tagset groups in block 1416. A query for a tag or tagset can quickly return all the addresses for resources 134 or bricks 130 by arranging those groups beforehand. The resource is added to the CMA by being coupled to the switching fabric 240 even though it may be inside or outside the CDN 110. Periodically, when polled or according to a schedule, the resource 134 or brick 130 reports health and other status to the metadata directory 275 in block 1424 for retention in the resource information store 544. The metadata directory 275 can avoid assigning new content objects to a resource 134 or brick 130 that is less healthy or more overloaded than the other members in the tag or tagset group.

Figure 15:
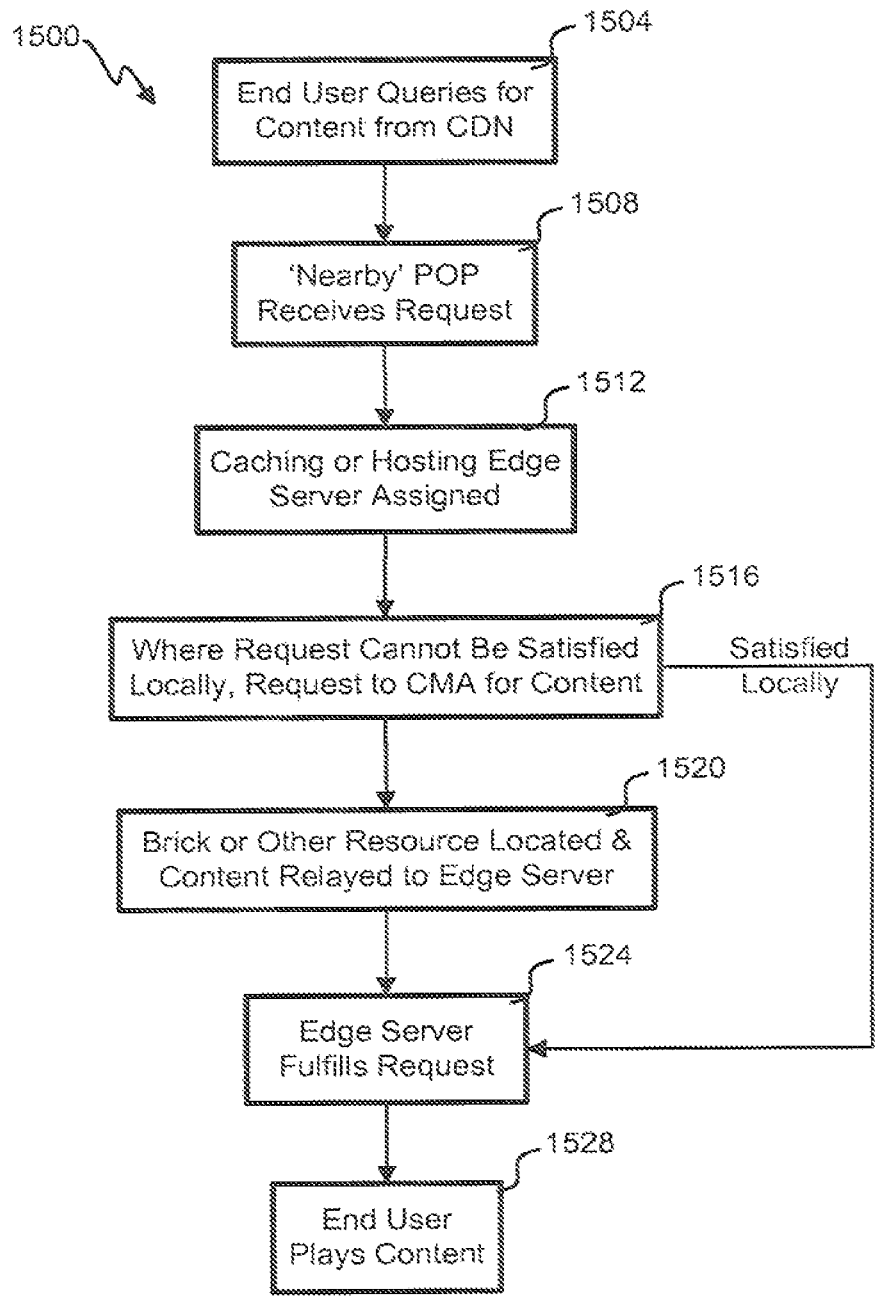
FIG. 15 illustrates a flowchart of an embodiment of a process for delivering a content object using the content management architecture.

With reference to FIG. 15, a flowchart of an embodiment of a process 1500 for delivering a content object using the CMA is shown. The depicted portion of the process begins in block 1504 where the end user system 102 queries for content from the CDN 110. Through Anycast, redirection, switching, or DNS resolution, the request finds its way to a 'nearby' POP 120. Closeness is a function of network proximity which generally corresponds to geographic proximity, but not necessarily so.

In block 1512, a caching or hosting edge server 230 is assigned. Where the edge server 230 cannot satisfy the request locally, a request is made to the CMA for the content object. Through the process outlined in FIGS. 7 and 8 above, the resource 134 or brick 130 is located and the content is relayed or proxied to the edge server 230 in block 1520. In block 1524, the edge server fulfils the request. The end user plays the content in block 1528.

Figure 16A:
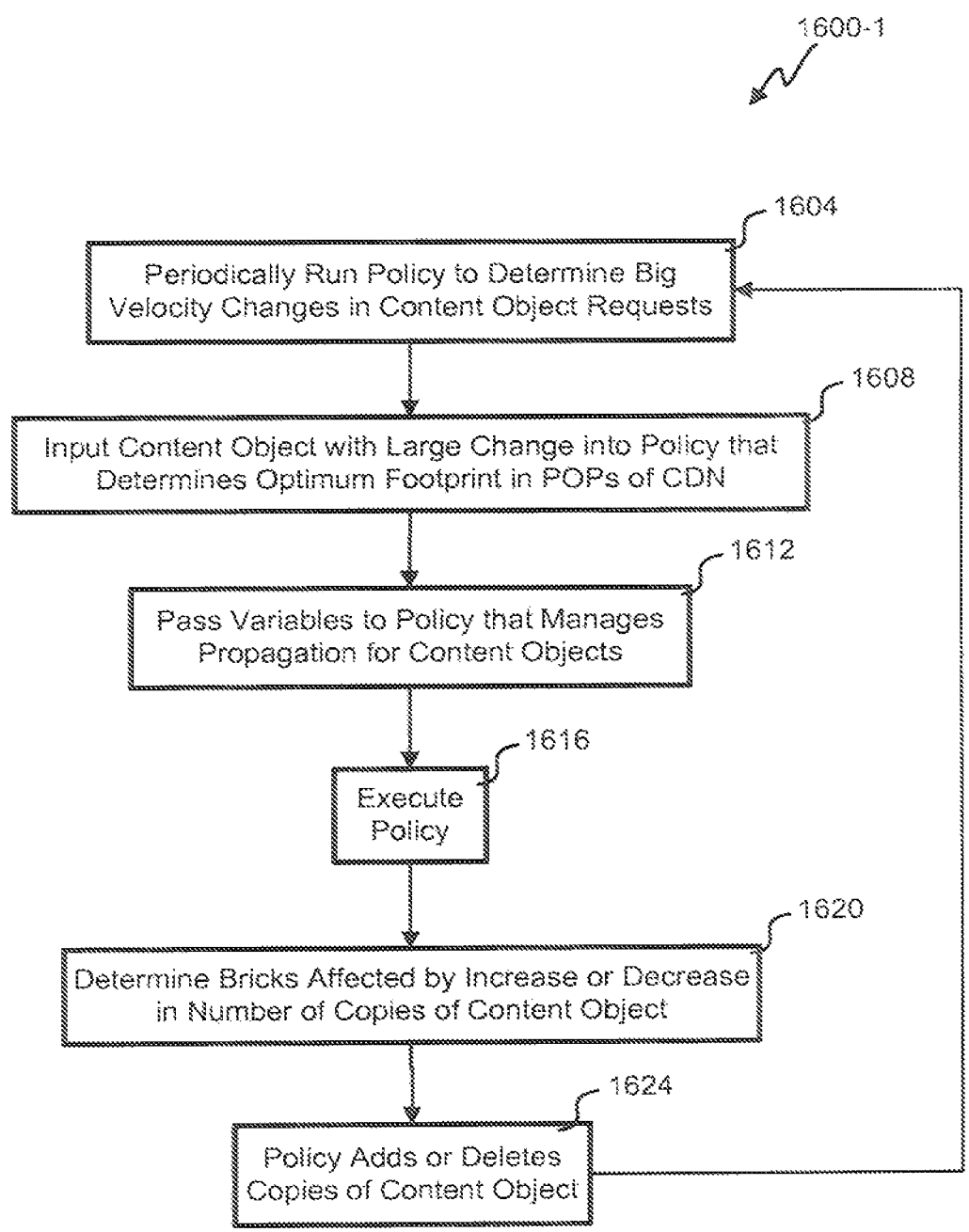
FIGS. 16A and 16B illustrate flowcharts of embodiments of a process for elastically managing propagation of content objects.

Referring next to FIG. 16A, a flowchart of an embodiment of a process 1600-1 for elastically managing propagation of content objects is shown. This workflow is implemented with the CMA using various policies to scale-up or scale-down the propagation of content objects in a fluid manner. The depicted portion of the process 1600 begins in block 1604 where a policy measures popularity content metadata 512 for a content object. A counter in the CDN tracks the popular content and updates the content metadata 512 in the metadata directory 275 accordingly. Popularity could be measured on a scale of one to one hundred with the most popular being at one hundred and the least popular being at one. The policy measures acceleration in popularity by keeping a number of past data points for the content objects.

In block 1608, the quickest changes are addressed by adding the name of the content file to a list in a policy. The footprint algorithm could be run separately in each POP 120 to measure local popularity or could be run to measure popularity in all POPs 120. The footprint is a function of how many requests are likely, the size of the content object, the QoS desired for delivery, and the level of CDN service ordered by the customer. In block 1612, the policy is passed variables that manage propagation of the content objects to accomplish a desired footprint. The variables would updates a disposition PRS parameter accordingly in the policy.

In block 1616, the policy implementing the footprint change for the content objects experiencing the quickest changes is performed by the policy manager 504. The bricks 130 to store or delete in each tag or tagset group are determined in block 1620. The tag and tagsets chosen as criteria define the footprint even though the metadata directory 275 chooses the individual bricks 130 that have the tag or tagset assigned to it. The policy adds or deletes copies of the content objects with the highest acceleration accordingly.

Figure 16B:
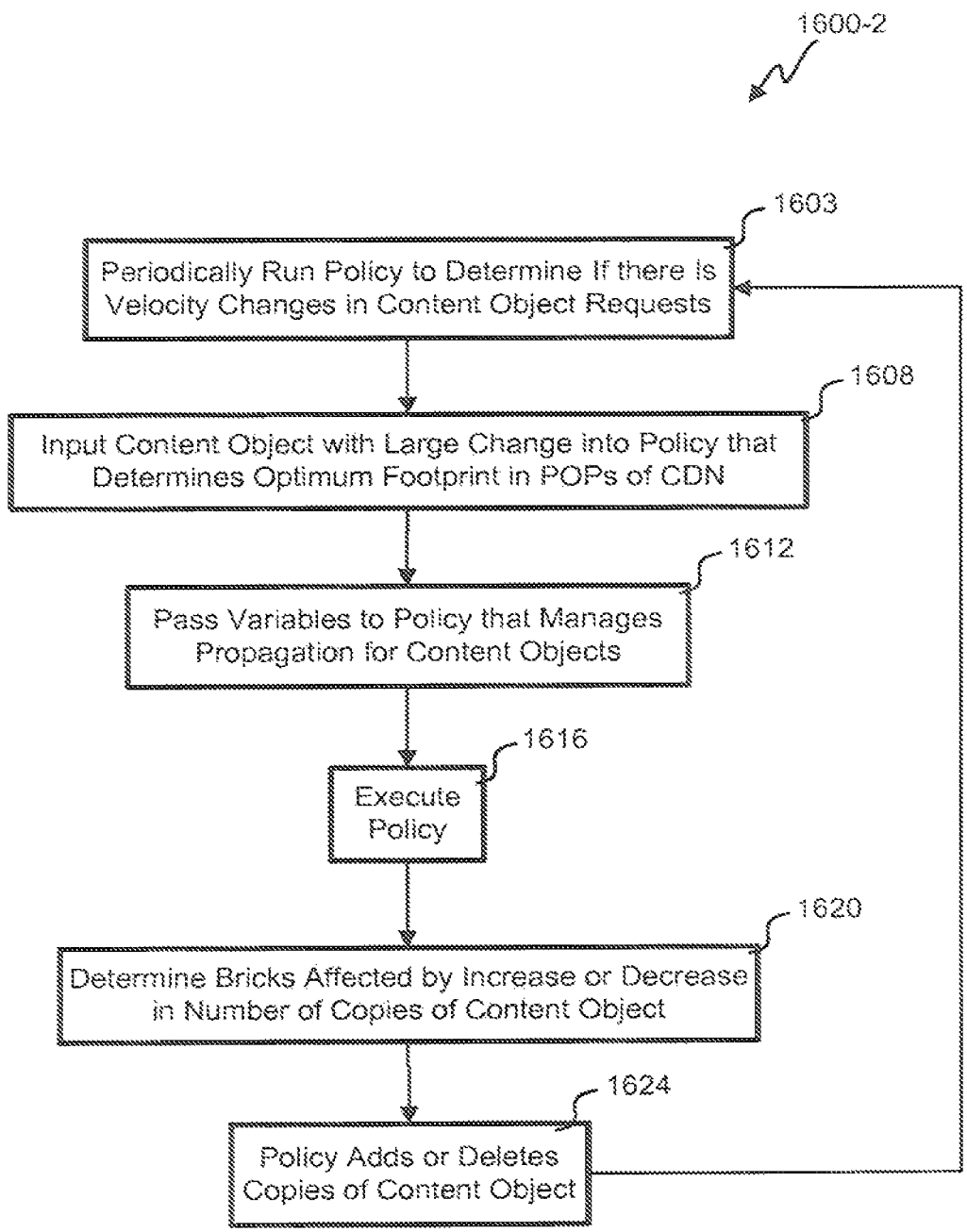

Referring next to FIG. 16B, a flowchart of an embodiment of a process 1600-1 for elastically managing propagation of content objects is shown. Unlike the embodiment of FIG. 16A, this embodiment measures the velocity as a function of the popularity metadata. When the velocity changes, a policy triggers a reevaluation of the footprint in block 1603. The velocity may have to change by a certain percentage before triggering the reevaluation or may be checked periodically. Other embodiments could measure poor QoS feedback from end user systems 102 or complaints before modifying the footprint in block 1608. When the footprint changes, processing continues through the remainder of the blocks in a manner similar to FIG. 16A.

Figure 17:
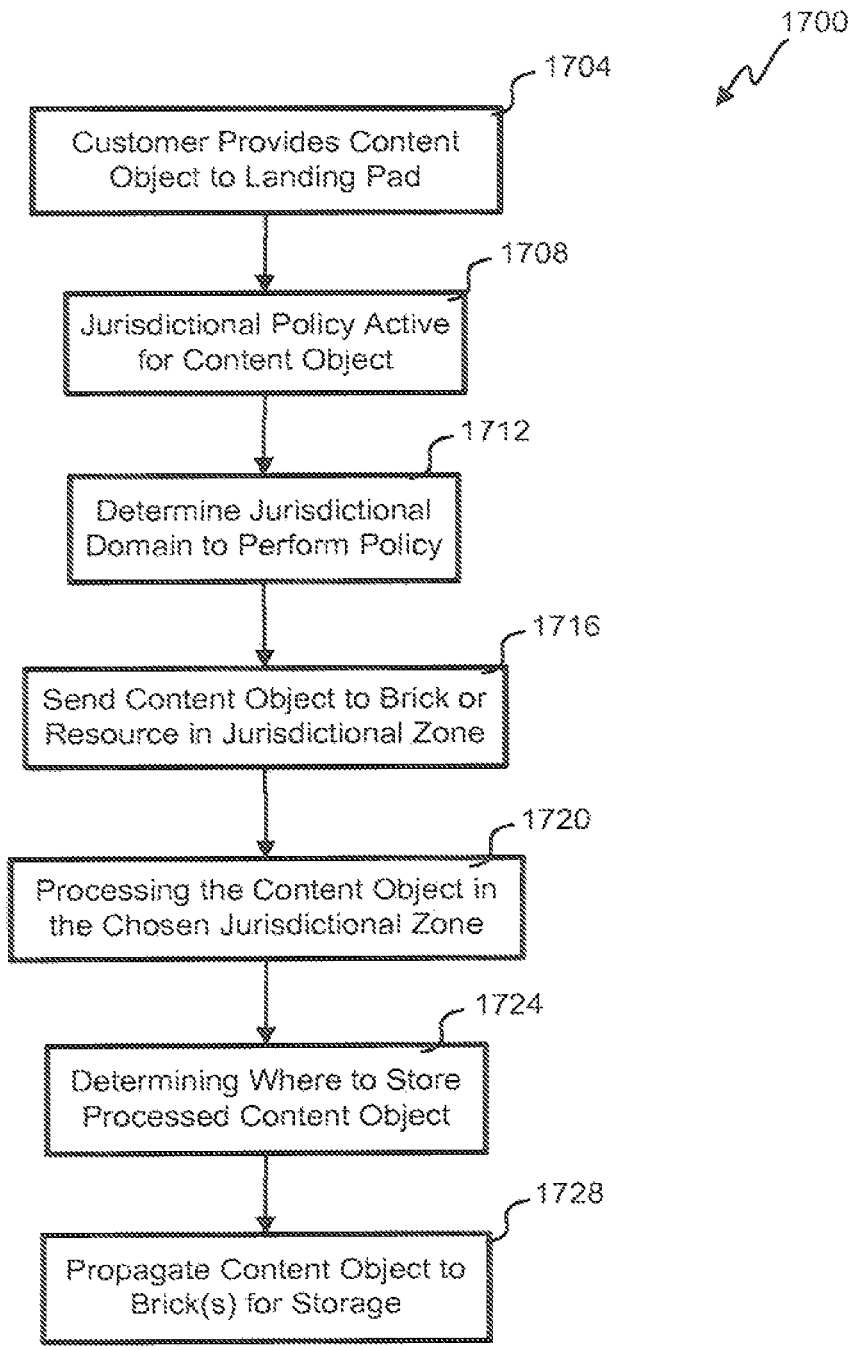
FIG. 17 illustrates a flowchart of an embodiment of a process for using policies to change the jurisdiction used to process a content object.

With reference to FIG. 17, a flowchart of an embodiment of a process 1700 for using policies to change the jurisdiction used to process a content object is shown. The POP 120 where the content object lands can be different from where it is processed and stored. Policies are used to accomplish customized processing for the different movements of a source file and its various processed versions. Resources 134 or bricks 130 may be less costly or underutilized in different parts of the CDN 110. For example, transcoder resources in India could be underused in the middle of the day in the United States due to the time differences. A policy could move transcodes to resources 134 in India.

The depicted portion of the process 1700 begins in block 1704 where the customer manually or automatically provides the content object to a landing pad 210 in one jurisdiction. A jurisdiction could be any legal, geographical or political boundary in this embodiment. The demarcations of a jurisdiction can be a custom geography perhaps defined in a license or other agreement. It is determined in block 1708 that a jurisdictional policy is active and applicable to the content object. In block 1712, the jurisdictional domain to perform the processing defined in the policy is determined. The processing could be a resource 134 and/or a brick 130. The content object is sent to brick 130 and/or resource 134 in target jurisdictional zone or domain. In block 1720, the content object is processed in the chosen jurisdictional zone 1720.

In block 1724, the disposition PRS parameter defining how to store the content object is analyzed. The jurisdictional zone for storage of the processed file can be different from the jurisdictional zone that received the file and processed the file. Bricks 130 with the proper tags or tagsets of the jurisdictional zone are selected from to assign individual bricks 130. In other examples, the policy may require that certain files be processed in the same jurisdictional zone as received. Further, embodiments may require receipt, processing and storage to be in the same jurisdictional zone. Without a policy restricting movement, processing and storage could choose resources and bricks outside the jurisdictional zone based upon, for example, those resources and bricks being under utilized.

A number of variations and modifications of the disclosed embodiments can also be used. For example, the above embodiments have a particular arrangement of the CMA, but blocks could be combined or split in any manner to still achieve the same functionality. Additionally, portions of the CMA could reside outside of the CDN. For example, the PRS, metadata directory, and/or content mapper could be maintained outside of the CDN.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A content delivery network (CDN) for storing content objects and delivering content objects over a network to a user computer, the CDN comprising:
   a switching fabric to receive and route requests for content objects from user computers to a particular edge server, the requests including a filename; and
   a plurality of points of presence (POPs) distributed geographically, each POP comprising:
   a metadata directory comprising a unique identifier assigner for assigning a unique identifier to a new content object;
   a content mapper coupled to a plurality of lookup listeners; and
   an edge server coupled to the switching fabric and to the content mapper, wherein the edge server is configured to receive a request for a content object from the switching fabric, the request including a file name and/or a path of the requested content object, and
   wherein the content mapper is configured to receive the file name and/or the path from the edge server; translate the file name and/or the path into a corresponding unique identifier, transmit, at least partially overlapping in time, the corresponding unique identifier to each of the lookup listeners, receive information identifying a location of a storage device of a plurality of storage devices storing the requested content object from one or more of the lookup listeners, and request the requested content object from the location, and
   wherein each lookup listener of the plurality of lookup listeners provides location information for any of a same set of storage devices that store at least some of a requested content object.

2. A method for sourcing a content object from a content delivery network (CDN) having a plurality of points of presence (POPs) distributed geographically, the method comprising:
   receiving the content object for storage on the CDN;
   determining, by a first content mapper in a first POP of the plurality of POPs, a unique identifier for the content object to distinguish it from other content objects in the CDN;
   transmitting, from the first content mapper, the unique identifier to each of the plurality of POPs distributed geographically within the CDN;
   storing the content object on a storage device chosen from a plurality of storage devices;
   receiving a uniform resource locator (URL) for the content object indicating a file name and path from an end user system at a second POP of the plurality of POPs;
   multicasting information corresponding to the file name and a path to a plurality of lookup listeners, wherein each lookup listener provides location information for any of a same set of storage devices that store at least some of the content object;
   receiving a response from a lookup listener including a first location of the storage device and the unique identifier;
   requesting the unique identifier from the first location;
   returning at least some of the content object from the first location to a second location within the CDN; and
   returning at least some of the content object to the end user system from the CDN.

3. The method for sourcing a content object from a CDN having a plurality of POPs distributed geographically as recited in claim 2, wherein the second POP was chosen from the plurality of POPs using an Anycast routing scheme.

4. The method for sourcing a content object from a CDN having a plurality of POPs distributed geographically as recited in claim 2, wherein the lookup listener was a first of plurality multiple of lookup listeners to respond to the multicasted information.

5. The method for sourcing a content object from a CDN having a plurality of POPs distributed geographically as recited in claim 2, further comprising reconciling lookup information between the plurality of lookup listeners.

6. A method for sourcing a content object from a content delivery network (CDN) having a plurality of points of presence (POPs) distributed geographically, the method comprising:
   receiving the content object for storage on the CDN;
   determining, by a content mapper, a unique identifier for the content object to distinguish it from other content objects in the CDN;
   transmitting, from the content mapper, the unique identifier to each of a plurality of content directories distributed geographically within the CDN;
   storing the content object on a storage device chosen from a plurality of storage devices;
   receiving a uniform resource locator (URL) for the content object indicating a file name and path from an end user system at a POP of the plurality of POPs;
   multicasting information corresponding to the file name and a path to the plurality of content directories, wherein each content directory can provide location information for any of a same set of storage devices that store at least some of the content object;
   receiving a response from a content directory including a first location of the storage device and the unique identifier;
   requesting the unique identifier from the first location;
   returning at least some of the content object from the first location to a second location within the CDN; and
   returning at least some of the content object to the end user system from the CDN.

7. The method for sourcing a content object from a content delivery network (CDN) having a plurality of points presence (POPs) distributed geographically of claim 6, wherein the determining the unique identifier is a one-way algorithm such that nothing can be learned about the path, the file name or the content object from the unique identifier alone.

8. The method for sourcing a content object from a CDN having a plurality of POPs distributed geographically as recited in claim 6, wherein the multicasting includes initiating a plurality of unicast streams, coextensive in time, to send the information.

9. The method for sourcing a content object from a CDN having a plurality of POPs distributed geographically as recited in claim 6, wherein the POP was chosen from the plurality of POPs using an Anycast routing scheme.

10. The method for sourcing a content object from a CDN having a plurality of POPs distributed geographically as recited in claim 6, wherein the content directory was a first of a plurality of content directories to respond to the multicasted information.

11. The method for sourcing a content object from a CDN having a plurality of POPs distributed geographically as recited in claim 6, further comprising reconciling lookup information between the plurality of content directories.

12. The method for sourcing a content object from a CDN having a plurality of POPs distributed geographically as recited in claim 6, further comprising: hashing the content object, the path and/or the file name.

13. A method for sourcing a content object from a content delivery network (CDN) having a plurality of points of presence (POPs) distributed geographically, the method comprising:
   receiving the content object for storage on the CDN;
   associating, by a first content mapper in a first POP of the plurality of POPs, the content object with an identifier to distinguish it from other content objects in the CDN;
   transmitting, from the first content mapper, the identifier to each of the plurality of POPs distributed geographically within the CDN;
   storing the content object on a first storage device chosen from a plurality of storage devices;
   receiving a first request for the content object from an end user system at a second POP of the plurality of POPs;
   transmitting, at least partially overlapping in time, information about the requested content object to a plurality of lookup listeners, wherein each lookup listener provides location information for any of the plurality a same set of storage devices that store at least some of the content object;
   receiving a response from a first lookup listener indicating that the content object is stored at a first location, the first location being a location of the first storage device;
   transmitting, to the first location, a second request for the content object;
   receiving, at a second location within the CDN, at least some of the content object from the first location, the second location being different from the first location; and
   returning at least some of the content object to the end user system from the CDN.

14. The method for sourcing a content object from the CDN having the plurality of points of presence (POPs) distributed geographically as recited in claim 13, further comprising:
   receiving a response from a second lookup listener indicating that the content object is stored at a third location, the third location being a location of a second storage device, and
   determining that the response from the first lookup listener was received after the response from the second lookup listener.

15. The method for sourcing a content object from the CDN having the plurality of POPs distributed geographically as recited in claim 13, wherein the second request for the content object is transmitted immediately and automatically after receiving the response from the first lookup listener.

16. The method for sourcing a content object from the CDN having the plurality of POPs distributed geographically as recited in claim 13, wherein the information comprises the identifier.

17. A content delivery network (CDN) having a plurality of points of presence (POPs) distributed geographically for sourcing a content object, the CDN comprising two or more hardware servers programmed for:
   receiving the content object for storage on the CDN;
   determining, by a first content mapper in a first POP of the plurality of POPs, a unique identifier for the content object to distinguish it from other content objects in the CDN;
   transmitting, from the first content mapper the unique identifier to each of the plurality of POPs distributed geographically within the CDN;
   storing the content object on a storage device chosen from a plurality of storage devices;
   receiving a uniform resource locator (URL) for the content object indicating a file name and a path from an end user system at a POP of the plurality of POPs;
   multicasting information corresponding to the file name and the path to a plurality of lookup listeners, wherein each lookup listener provides location information for any of the plurality of storage devices that store at least some of the content object;
   receiving a response from a lookup listener including a first location of the storage device and the unique identifier;

requesting the unique identifier from the first location;
returning at least some of the content object from the first location to a second location within the CDN; and
returning at least some of the content object to the end user system from the CDN.

18. The CDN having the plurality of POPs distributed geographically for sourcing the content object as recited in claim 17, wherein the second location is an edge server in the POP.

19. The CDN having the plurality of POPs distributed geographically for sourcing the content object as recited in claim 17, wherein the first location is accessed using an internet protocol (IP) address.

20. The CDN having the plurality of POPs distributed geographically for sourcing the content object as recited in claim 17, wherein the storage device is unaware of the file name and/or the path.

21. A content delivery network (CDN) having a plurality of points of presence (POPs) distributed geographically for sourcing a content object, the CDN comprising:
   a mapper transport, located in a first POP of the plurality of POPs for:
   receiving a request for a content file; and
   transmitting, at least partially overlapping in time, multiple and identical requests for information about a location of the content file to each of a plurality of lookup listeners, distributed geographically within the CDN; and
   a first of a plurality of lookup listeners programmed for:
   receiving one of the location requests;
   querying a mapper cabinet that associates content files with storage addresses; and
   transmitting information identifying a storage location of the content file to the mapper transport,
   wherein each lookup listener of the plurality of lookup listeners provides location information for any of a same set-of storage devices that store at least some of the content file.

22. The CDN having a plurality of POPs distributed geographically for sourcing the content object as recited in claim 21, wherein the mapper transport is further programmed for requesting the content file from the storage location.

23. The CDN having a plurality of POPs distributed geographically for sourcing the content object as recited in claim 21, wherein the transmitted requests include a unique identifier assigned to the content file.

24. The CDN having a plurality of POPs distributed geographically for sourcing the content object as recited in claim 21, wherein the storage location is outside a domain of the CDN.

* * * * *

UNITED STATES PATENT AND TRADEMARK OFFICE
CERTIFICATE OF CORRECTION

PATENT NO. : 8,458,290 B2  Page 1 of 2
APPLICATION NO. : 13/341724
DATED : June 4, 2013
INVENTOR(S) : Black et al.

It is certified that error appears in the above-identified patent and that said Letters Patent is hereby corrected as shown below:

In the Claims:

Column 20, lines 26-67: please delete claims 2-5 and replace with:
--2. The CDN for storing content objects and delivering content objects over a network to a user computer as recited in claim 1, further comprising the lookup listeners.
3. The CDN for storing content objects and delivering content objects over a network to a user computer as recited in claim 2, further comprising a plurality of mapper cabinets, each of the mapper cabinets being coupled to a respective lookup listener, and each of the mapper cabinets storing a list of file names and/or paths and associated unique identifiers.
4. The CDN for storing content objects and delivering content objects over a network to a user computer as recited in claim 1, wherein each POP comprises at least a thousand edge servers.
5. The CDN for storing content objects and delivering content objects over a network to a user computer as recited in claim 1, wherein the location of the storage device is outside a domain of the CDN.--

Column 21, lines 1-30: please delete claim 6 and replace with:
--6. A method for sourcing a content object from a content delivery network (CDN) having a plurality of points of presence (POPs) distributed geographically, the method comprising:
    receiving the content object for storage on the CDN;
    determining, by a first content mapper in a first POP of the plurality of POPs, a unique
        identifier for the content object to distinguish it from other content objects in the
        CDN;
    transmitting, from the first content mapper, the unique identifier to each of the plurality of
        POPs distributed geographically within the CDN;
    storing the content object on a storage device chosen from a plurality of storage devices;
    receiving a uniform resource locator (URL) for the content object indicating a file name and
        path from an end user system at a second POP of the plurality of POPs;
    multicasting information corresponding to the file name and a path to a plurality of lookup
        listeners, wherein each lookup listener provides location information for any of a Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,458,290 B2

In the Claims (Continued):

same set of storage devices that store at least some of the content object;
   receiving a response from a lookup listener including a first location of the storage device and the unique identifier;
   requesting the unique identifier from the first location;
   returning at least some of the content object from the first location to a second location within the CDN; and
   returning at least some of the content object to the end user system from the CDN.--

Column 21, lines 43-55: please delete claims 9-11 and replace with:
--9. The method for sourcing a content object from a CDN having a plurality of POPs distributed geographically as recited in claim 6, wherein the second POP was chosen from the plurality of POPs using an Anycast routing scheme.
10. The method for sourcing a content object from a CDN having a plurality of POPs distributed geographically as recited in claim 6, wherein the lookup listener was a first of a multiple of lookup listeners to respond to the multicasted information.
11. The method for sourcing a content object from a CDN having a plurality of POPs distributed geographically as recited in claim 6, further comprising reconciling lookup information between the plurality of lookup listeners.--